(12) United States Patent
Wang et al.

(10) Patent No.: US 11,388,265 B2
(45) Date of Patent: Jul. 12, 2022

(54) MACHINE-TO-MACHINE PROTOCOL INDICATION AND NEGOTIATION

(71) Applicant: CONVIDA WIRELESS, LLC, Wilmington, DE (US)

(72) Inventors: Chonggang Wang, Princeton, NJ (US); Guang Lu, Thornhill (CA); Lijun Dong, San Diego, CA (US); Xu Li, Plainsboro, NJ (US); Quang Ly, North Wales, PA (US); Zhuo Chen, Claymont, DE (US); Shamim Akbar Rahman, Cote St. Luc (CA); Yanyan Han, Lafayette, LA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/541,119

(22) PCT Filed: Jan. 4, 2016

(86) PCT No.: PCT/US2016/012018
§ 371 (c)(1),
(2) Date: Jun. 30, 2017

(87) PCT Pub. No.: WO2016/111914
PCT Pub. Date: Jul. 14, 2016

(65) Prior Publication Data
US 2018/0007172 A1      Jan. 4, 2018

Related U.S. Application Data

(60) Provisional application No. 62/099,726, filed on Jan. 5, 2015.

(51) Int. Cl.
*G06F 15/16*    (2006.01)
*H04L 69/00*    (2022.01)
*H04L 67/54*    (2022.01)

(52) U.S. Cl.
CPC .............. *H04L 69/02* (2013.01); *H04L 67/24* (2013.01)

(58) Field of Classification Search
CPC ......... H04L 69/02; H04L 69/24; H04L 67/24; H04L 29/06537
(Continued)

(56) References Cited

U.S. PATENT DOCUMENTS 6,445,716 B1 * 9/2002 Favichia ................. H04L 69/24
370/466
6,671,367 B1 * 12/2003 Graf ......................... H04L 29/06
379/229
(Continued)

FOREIGN PATENT DOCUMENTS

EP          2341687 A1     7/2011

OTHER PUBLICATIONS

Isam Ishaq, Flexible Unicast-Based Gropup Communication for CoAP-enabled devices, 2014.*
(Continued)

*Primary Examiner* — Oscar A Louie
*Assistant Examiner* — Messeret F Gebre
(74) *Attorney, Agent, or Firm* — BakerHostetler

(57) ABSTRACT

Network entities may indicate and negotiate one or more new protocols for communications using a current protocol. Indications may include one or more protocols which are supported, one or more protocols which are preferred, and the level of desire of preferences. Indications may further include schedules of times during which certain protocols are supported and/or schedules of functions for which certain protocols are preferred. Indications may be evaluated and acted upon immediately or stored for future reference. Evaluation may include comparison of relative desire levels (Continued)

and needs of various entities. Protocols may be messaging protocols, transport protocols, or combinations thereof.

20 Claims, 20 Drawing Sheets

(58) Field of Classification Search
USPC .......................................................... 709/230
See application file for complete search history.

(56) References Cited

U.S. PATENT DOCUMENTS

| | | | | |
|---|---|---|---|---|
| 8,332,526 | B2* | 12/2012 | Kruse | H04L 29/08072 709/230 |
| 2006/0116148 | A1* | 6/2006 | Bahl | H04W 28/18 455/517 |
| 2007/0019672 | A1 | 1/2007 | Guthrie | |
| 2010/0094847 | A1* | 4/2010 | Malan | G06F 17/30893 707/705 |
| 2013/0007156 | A1* | 1/2013 | Roy | H04L 51/066 709/206 |
| 2013/0024556 | A1 | 1/2013 | Zhu | |
| 2014/0059168 | A1* | 2/2014 | Ponec | H04L 67/02 709/217 |
| 2014/0089478 | A1* | 3/2014 | Seed | H04W 4/70 709/222 |
| 2014/0126581 | A1* | 5/2014 | Wang | H04L 41/0273 370/431 |
| 2014/0140242 | A1 | 5/2014 | Xiao et al. | |
| 2015/0236411 | A1* | 8/2015 | Garrett | H01Q 3/24 370/338 |
| 2017/0147443 | A1* | 5/2017 | Spieler | G06F 11/1453 |

OTHER PUBLICATIONS

Isam Ishaq, "IETF Standardization in the filed of the Ineternt of Things (IOT): Servey", 2013.*
Shelby, "Introduction to Resource-Oriented Applications in Constrained Networks", Mar. 27, 2011.*
D. J. Frank, "Power-constrained device and technology design for the end of scaling," Digest. International Electron Devices Meeting,, 2002, pp. 643-646, doi: 10.1109/IEDM.2002.1175921. (Year: 2002).*
Samaras, I. K., Gialelis, J. V., Hassapis, G. D., & Akpan, V. A. (2009). Utilizing semantic web services in factory automation towards integrating resource constrained devices into enterprise information systems (Year: 2009).*
M. Bafandehkar, S. M. Yasin, R. Mahmod and Z. M. Hanapi, "Comparison of ECC and RSA Algorithm in Resource Constrained Devices," 2013 International Conference on IT Convergence and Security (ICITCS), 2013, pp. 1-3. (Year: 2013).*
Wei et al., "Fast TCP: Motivation, Architecture, Algorithms, Performance" IEEE/ACM Transactions on Networking 2006, 14(6), pp. 1246-1259.
Tan et al., "A Compound TCP Approach for High-Speed and Long Distance Networks", IEEE INFOCOM 2006, 12 pages.

Service Name and Transport Protocol Port Number Registry, http://www.iana.org/assignments/service-names-port-numbers/service-names-port-numbers.xhtml, Oct. 2018, 318 pages.
Protocol Numbers, http://www.iana.org/assignments/protocol-numbers/protocol-numbers.xhtml, Oct. 2017, 10 pages.
MQTT V3.1 Protocol Specification, http://public.dhe.ibm.com/software/dw/webservices/ws-mqtt/mqtt-v3r1.html, Oct. 10, 2018, 44 pages.
MQTT for Sensor Networks (MQTT-SN) Protocol Specification, ver1.2, (http://mqtt.org/new/wp-content/uploads/2009/06/MQTT-SN_spec_v1.2pdf), Nov. 14, 2013, 28 pages.
IETF, Observing Resources in CoAP, draft-ieft-core-observe-14, Jun. 2014, 33 pages.
IETF RFC-793, Transmission Control Protocol, DARPA Internet Program, Sep. 1981, 161 pages.
IETF RFC-768, User Datagram Protocol, Aug. 1980, 5 pages.
IETF RFC-7252, The Constrained Application Protocol (CoAP), Jun. 2014, 113 pages.
IETF RFC-7230, Hypertext Protocol (HTTP/1.1), Message Syntax and Routing, Jun. 2014, 90 pages.
IETF RFC-6775, Neighbor Discovery Optimization for IPv6 over Low-Power Wireless Personal Area Networks (6LoWPANs), Nov. 2012, 56 pages.
IETF RFC-6763, DNS-Based Service Discovery, Feb. 2013, 50 pages.
IETF RFC-6690, Constrained RESTful Environments (CoRE) Link Format, Aug. 2012, 23 pages.
IETF RFC-6455, The WebSocket Protocol, Dec. 2011, 72 pages.
IETF RFC-6347, Datagram Transport Layer Security Version 1.2, Jan. 2012, 33 pages.
IETF RFC-6182, Architectural Guidelines for Multipath TCP Development, Mar. 2011, 29 pages.
IETF RFC-5622, Profile for Datagram Congestion Control Protocol (DCCP), Congestion ID 4: TCP-Friendly Rate Control for Small Packets (TFRC-SP), Aug. 2009, 19 pages.
IETF RFC-5246, The Transport Layer Security (TLS) Protocol, Version 1.2, Aug. 2008, 105 pages.
IETF RFC-4884, Extended ICMP to Support Multi-Part Messages, Apr. 2007, 20 pages.
IETF RFC-4340, Datagram Congestion Control Protocol (DCCP), Mar. 2006, 130 pages.
IETF RFC-4301, Security Architecture for the Internet Protocol, Dec. 2005, 102 pages.
IETF RFC-3315, Dynamic Host Configuration Protocol for IPv6 (DHCPv6), Jul. 2003, 102 pages.
IETF RFC-2960, Stream Control Transmission Protocol, Oct. 2000, 135 pages.
IETF Draft, draft-Natarajan-http-over-sctp-02, Using SCTP as a Transport Layer Protocol for HTTP, Jul. 2009, 13 pages.
Ha et al., "Cubic: A New TCP-friendly high-speed TCP variant", ACM SIGOPS Operating Systems Review, 2008, 42(5), pp. 64-74.
Brakmo et al., "TCP Vegas: Ne Techniques for Congestion Detection and Avoidance", ACM SIGCOMM'94, 1994, No. 4, pp. 24-35.
AMQP: A General-Purpose Middleware Standard, version 0-10, 2006, 291 pages.

* cited by examiner

User Interface for an IoT Entity

Configure/display parameters related to Protocol Indication and Negotiation (PIN)

1. SupportedMessageProtocol (SuMP): HTTP (TCP), MQTT(TCP), CoAP (TCP, UDP)

2. DesiredMessagingProtocol (DeMP): MQTT (TCP), CoAP (UDP)
   → DesireLevel: Low for MQTT(TCP), High for CoAP (UDP)

3. SelectedMessagingProtocol (SeMP): CoAP (UDP)

MACHINE-TO-MACHINE PROTOCOL INDICATION AND NEGOTIATION

CROSS-REFERENCE TO RELATED APPLICATIONS

This application is a National Stage Application filed under 35 U.S.C. 371 of International Application No. PCT/US2016/012018 filed Jan. 4, 2016, which claims the benefit of U.S. Provisional Patent Application Ser. No. 62/099,726, filed Jan. 5, 2015, the disclosure of which is hereby incorporated by reference as if set forth in its entirety.

BACKGROUND

Machine-to-machine (M2M) systems (also called Internet-of-Things (IoT) or web of things (WoT) systems) often incorporate multiple interconnected heterogeneous networks in which various networking protocols are used to support diverse devices, applications, and services. These protocols have different functions and features, each optimized for one situation or another. There is no one-size-fits-all solution due to the diversity of devices, applications, services, and circumstances.

Certain protocols provide for a dialogue in which the entities may adjust protocol parameters. For example, HTTP enables entities to select the best representation of content to be provided based on user capabilities and user preferences that are indicated in request header fields. During the TLS/DTLS handshake protocol, a TLS/DTLS client and server pair can exchange and negotiate the protocol version of TLS/DTLS itself to be used on both the client and the server. AMQP includes a similar handshake procedure for selecting the version of AMQP to be used. In DCCP, during the connection phase, the endpoints may determine whether to use such DCCP features as congestion control and friendly rate control.

SUMMARY

Network entities may indicate and negotiate one or more new protocols for communications using a current protocol. Protocols in this context may be, for example, messaging protocols or transport mechanisms, routing protocols, or combinations thereof, etc. Indications may include one or more protocols which are supported, one or more protocols which are preferred, and the level of desire of preferences. Indications may further include schedules of times and circumstances during which certain protocols are supported and/or preferred. Indications may be evaluated and acted upon immediately or stored for future reference. Evaluation may include comparison of relative desire levels and needs of various entities.

A network entity in this context may be, for example, an apparatus which is a computing device which resides at a node of the network, such as a user device, a gateway, or a server. A network entity may also be a processes running on such an apparatus, such as a service, an application, etc. Protocol indication and negotiation may be achieved by new protocols and/or new processes residing in different protocol layers, such as the network layer, the transport layer, and/or the service layer of a network entity. Protocol indication and negotiation may also be achieved through extensions and/or enhancements of existing protocols, such as Neighbor Discovery (ND), Transmission Control Protocol (TCP), Transport Layer Security/Datagram Transport Layer Security (TLS/DTLS), Dynamic Host Configuration Protocol (DHCP), Resource Directory (RD), and Constrained Application Protocol (CoAP).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 16 is an example of a graphical user interface for context-aware protocol settings.

DETAILED DESCRIPTION

Network entities may indicate and negotiate one or more new protocols for communications using a current protocol.

Protocols in this context may be, for example, messaging protocols or transport mechanisms, or combinations thereof, etc. (Herein the term "protocol" may also refer to a process, procedure, or method, such as those for indicating, negotiating, and establishing new messaging and transport protocols.) Indications may include one or more protocols which are supported, one or more protocols which are preferred, and the level of desire of preferences. Indications may further include schedules of times and circumstances during which certain protocols are supported and/or preferred. Indications may be evaluated and acted upon immediately or stored for future reference. Evaluation may include comparison of relative desire levels and needs of various entities.

A network entity in this context may be, for example, an apparatus which is a computing device which resides at a node of the network, such as a user device, a gateway, or a server. A network entity may also be a processes running on such an apparatus, such as a service, an application, etc. Protocol indication and negotiation may be achieved by new protocols and/or new processes residing in different protocol layers, such as the network layer, the transport layer, and/or the service layer of a network entity. Protocol indication and negotiation may also be achieved through extensions and/or enhancements of existing protocols, such as Neighbor Discovery (ND), Transmission Control Protocol (TCP), Transport Layer Security/Datagram Transport Layer Security (TLS/DTLS), Dynamic Host Configuration Protocol (DHCP), Resource Directory (RD), and Constrained Application Protocol (CoAP).

Figure 1:
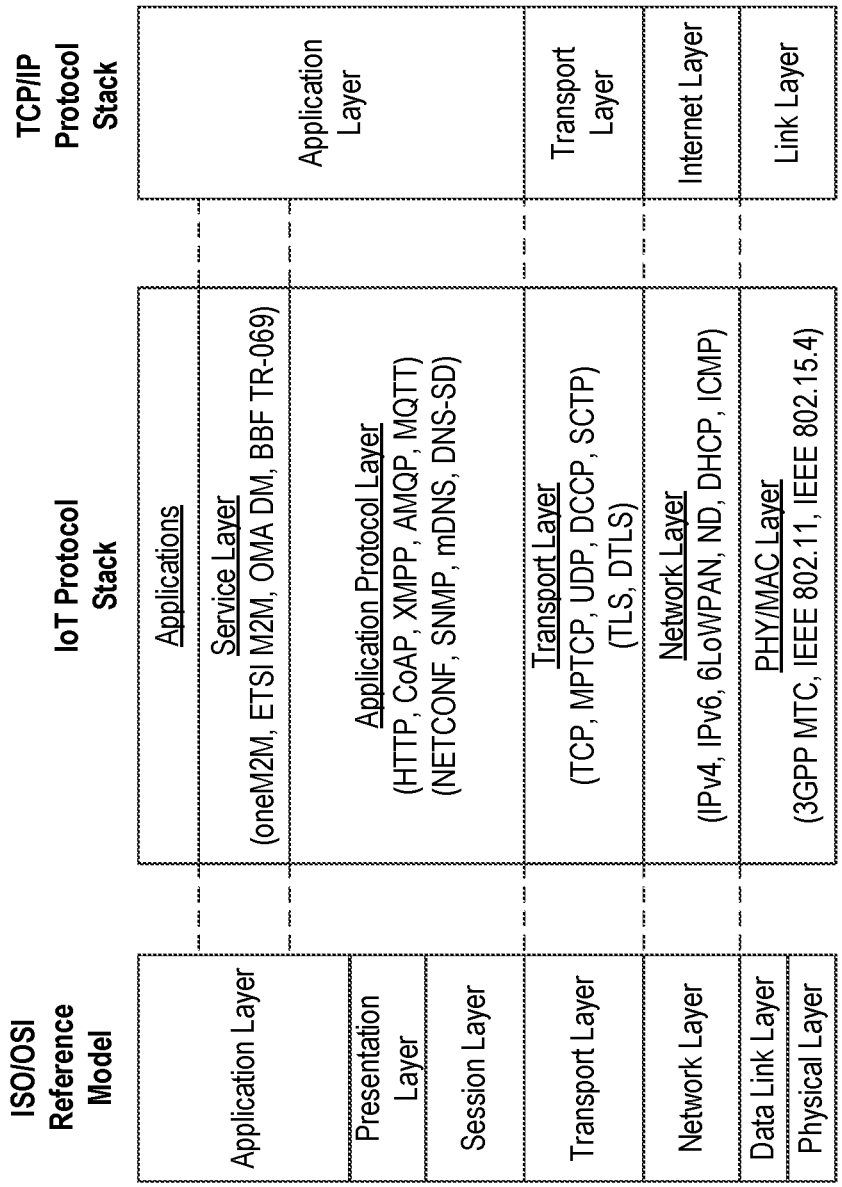
FIG. 1 is an example of an IoT protocol stack.

A wide variety of options are available for communication between IoT entities. FIG. 1 illustrates an example of an IoT protocol stack, at center, with a mapping to the ISO/OSI reference model on the left, and a classic TCP/IP protocol stack on the right side. An IoT entity, such as an IoT device, IoT gateway, IoT server, IoT application, etc., may support the whole protocol stack or a portion thereof. As illustrated, there are multiple alternative protocols available at every layer. For example, the service layer may use one M2M, ETSI M2M, OMA DM, BBF TR-069, etc. The PHY/MAC layer may use 3GPP MTC, IEEE 802.11, IEEE 802.15.4, etc.

The application protocol layer may use HTTP, CoAP, MQTT, XMPP, AMQP, etc. Most messaging protocols are based on a client/server model. Message protocols may be connection-oriented or connectionless and may run over various transport protocols. For example, HTTP is a connection-oriented messaging protocol that runs on top of TCP. In addition, HTTP may "layer on" other transport protocols such as STCP. CoAP is a connectionless messaging protocol that normally runs on top of UDP, but may also be used over TCP and Web Socket. MQTT is a broker-based publication/subscription (Pub/Sub) messaging protocol that runs on top of TCP. MQTT-SN is an extension for sensor networks that may be over UDP as well.

The transport layer may use TCP, MPTCP, UDP, DCCP, SCTP, TLS, DTLS, etc. Traditionally only two transport protocols, TCP and UDP, were defined for the Internet. TCP is a reliable connection-oriented transport protocol with flow and congestion control mechanisms, while UDP is designed as a simple connectionless transport protocol without guaranteed reliability. Many TCP variants, such as TCP Vegas, TCP Cubic, Fast TCP, and CTCP, have been proposed to improve conventional TCP. In addition, SCTP and MPTCP may be available to support multi-homing and/or multi-path features.

The network layer may use IPv4, IPv6, 6LoWPAN, NDP, DHCP, ICMP, etc. IPv4 and IPv6 are Internet network layer protocols for including routing protocols (e.g. open shortest path first) and mobility protocols (e.g. mobile IPv4 and mobile IPv6). In order to leverage IPv6 protocol for IoT, the IETF 6LoWPAN working group has defined a few enhancements for running IPv6 in constrained devices, such as header compression and optimized neighbor discovery protocol (NDP). Other protocols in network layer include DHCP for dynamic IP address allocation and management, and ICMP for network-layer control and management.

An IoT entity may wish to change the messaging and/or transport protocols it is using for various reasons. Such reasons could include, for instance: the power or computing resources available to the entity; the nature of the connection or network segment over which the communications are made; and/or the nature of the content.

For example, a solar-powered apparatus may have enough power during daylight hours to support HTTP. At night, when the device is running on a reserve battery, in may be better to consume less power by using CoAP. Further, an IoT device such as a constrained device may not have enough computing or power resources to support multiple protocols simultaneously.

Similarly, an IoT entity may prefer to use different messaging protocols as they are fitting for different resource requirements. For example, an IoT gateway may have three resources: general sensor readings, video streaming, and Pub/Sub data. Such resources have different requirements for messaging protocols to access them efficiently. For example, CoAP may be better for accessing the general sensor readings, HTTP may be better for video streaming, and MQTT may be better for Pub/Sub data.

Figure 2:
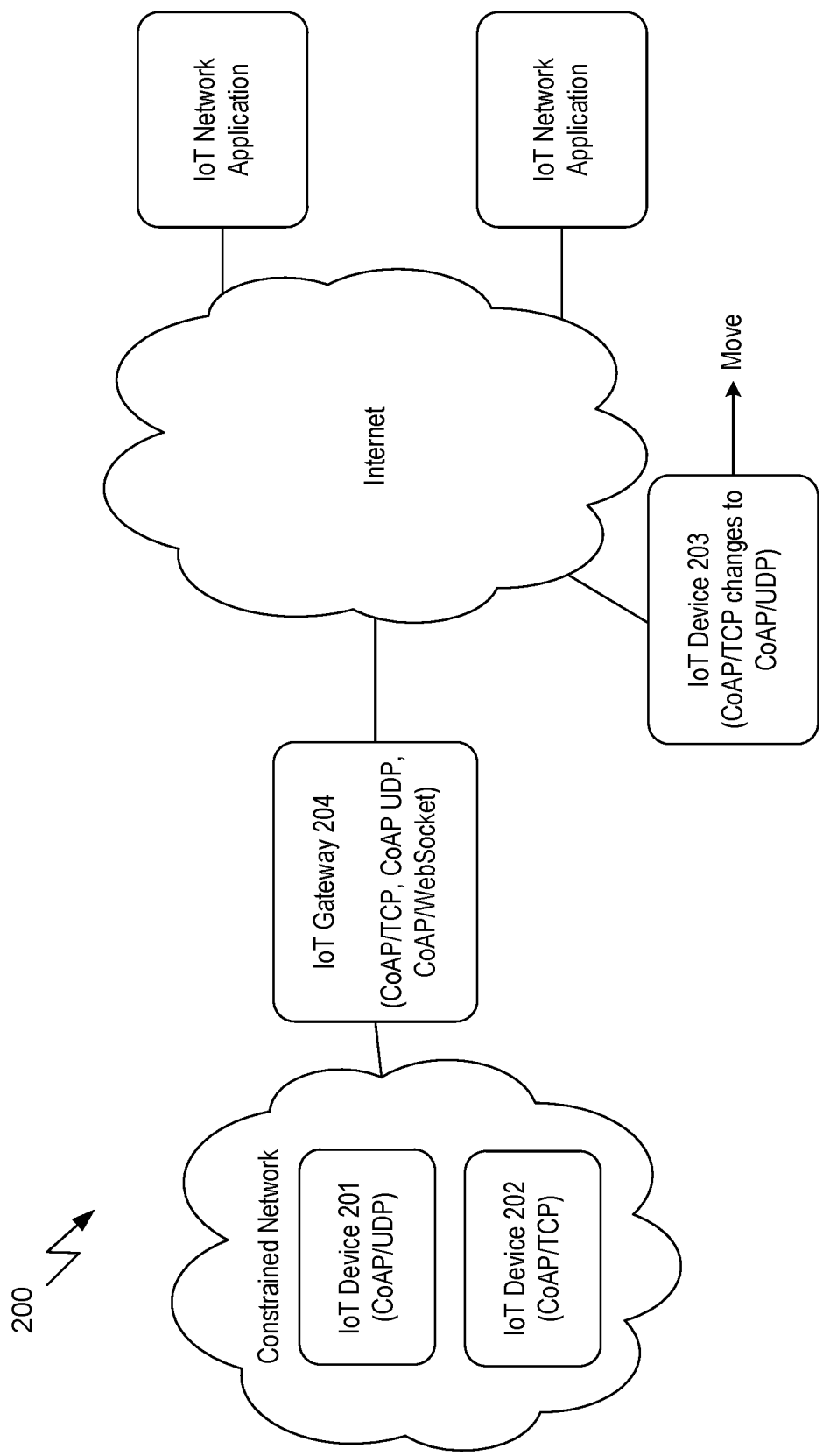
FIG. 2 is a block diagram of a system with CoAP devices with various transport capabilities.

An IoT entity using CoAP messaging may wish to use different transport mechanisms at different times and/or for different purposes. In the example illustrated in FIG. 2, a constrained resource IoT Device 201 supports CoAP over UDP to achieve better energy efficiency, while an IoT Device 202 generates continuous traffic and uses CoAP over TCP (or alternatively over Web Socket) to provide better reliability and flow control features. An IoT Device 203 supports CoAP over TCP when it has stable connectivity to Internet, but changes to CoAP over UDP when it physically moves (to avoid overhead from TCP disconnection and re-connection.) In this scenario, an IoT gateway 204 supports multiple transports since it connects to devices with different transports.

Similarly, an IoT entity using CoAP may wish to use different CoAP protocol features based on content-related requirements. The CoAP features of piggybacked response, timer-based retransmission and congestion control, block transfer, resource observation, etc., may introduce different overhead and benefits for different constrained devices. For example, an IoT device that is running CoAP and only generates small, sporadic traffic may not need to support congestion control and block transfer. A different IoT device running CoAP and normally produces sporadic traffic but sometimes answers a request for a large content representation may need a block control feature. Similarly, an IoT device running CoAP that generates continuous video streaming may need both congestion control and block transfer.

An IoT entity may wish to communicate with other devices for the purpose of discovering the other devices or being discovered. Consider, for example, a constrained network containing three different kinds of devices: devices supporting CoAP, devices supporting MQTT, and devices supporting HTTP. It may be necessary for devices of each type to discover other devices of the same type so that they can talk to each other. In any case, it is necessary and beneficial that all devices in the constrained network have the capability to find other devices of the same type so that they can communicate with each other.

For example, two IoT entities that discover each other using the same lower layer protocols such as 6LoWPAN NDP may otherwise end up with different messaging or transport protocol and therefore cannot talk with each other. In other words, 6LoWPAN NDP provides no such capability (i.e. for a device to discover other devices with the same type) since it enables a device to find any nearby devices no matter which type it belongs to.

An IoT entity may wish to use different protocols to communicate over different network segments. For example, an IoT gateway may prefer to use CoAP for communications with an IoT device via a constrained network, but the same gateway will prefer to use HTTP for communications with a server via the Internet.

Figure 3:
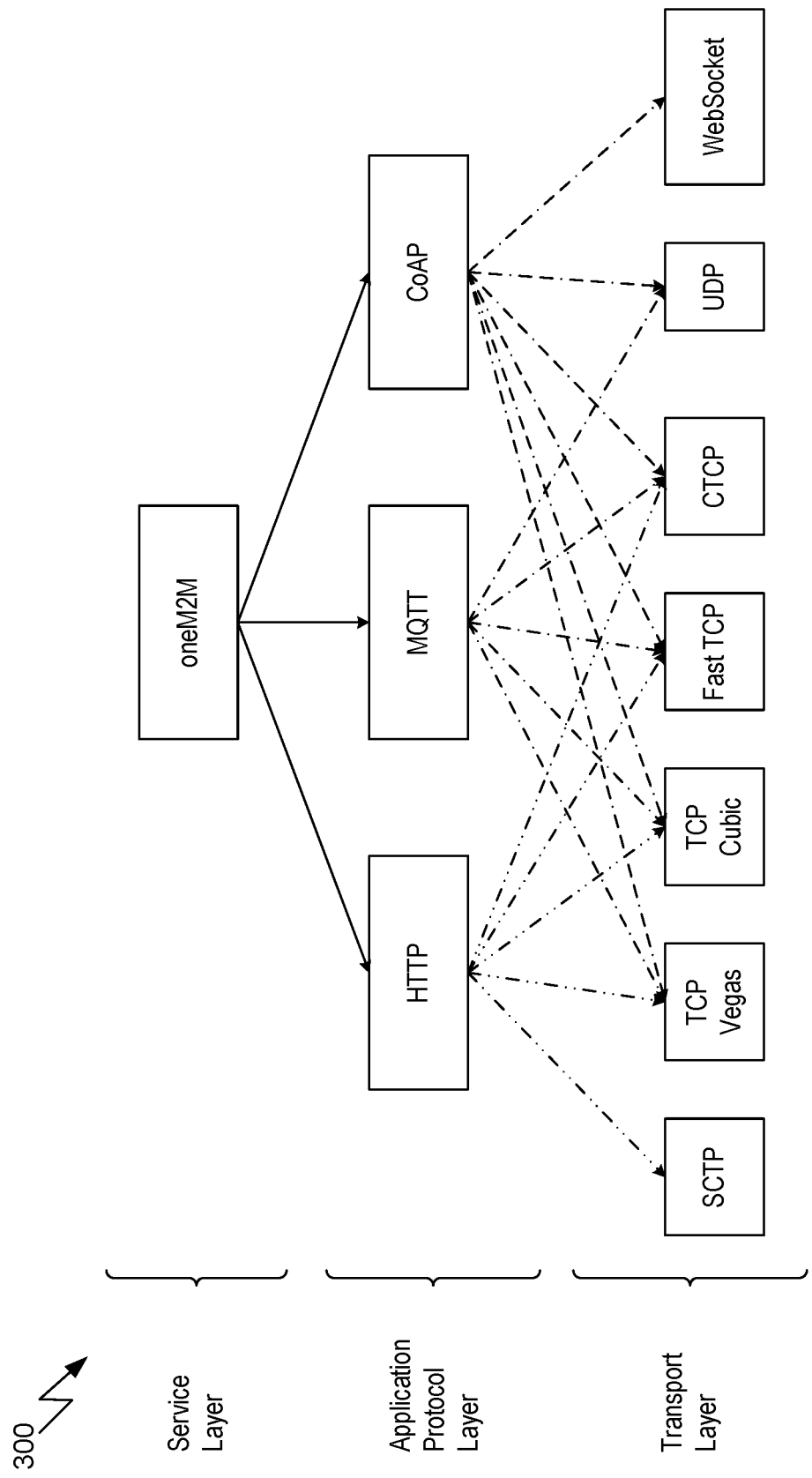
FIG. 3 is an example of various messaging and transport protocols that may exist in a single system.

Thus there are many protocols available for IoT devices, including many options for use in each protocol, and many reasons to use different protocols under different circumstances, such as varied times, resource type and availability, communication pathway, to name just a few. FIG. 3 illustrates an example where a oneM2M service layer could leverage multiple messaging protocols such as HTTP, MQTT, and CoAP. In turn, each messaging protocol may run on top several transport protocols. For example, HTTP can layer above SCTP, TCP and its variants (i.e. TCP Vegas, TCP Cubic, Fast TCP, CTCP), while CoAP can be supported by TCP and its variants, UDP, and Web Socket.

The existence of all these various protocols may cause a variety of issues. For example, applications or devices using different protocols may not be able to communicate to each other. Two IoT entities that discover each other using the same lower layer protocols such as 6LoWPAN NDP may end up with different messaging or transport protocol and therefore cannot talk with each other. Communications via proxy or other conversion means may not be efficient, and in any case the burden of such overhead may be too heavy for many IoT constrained devices.

Protocol Indication and Negotiation (PIN)

Protocol indication and negotiation (PIN) can be accomplished in a dialogue between two IoT entities under a first message protocol and a first transport mechanism to establish a next protocol and a next transport mechanism to be used.

Figure 4:
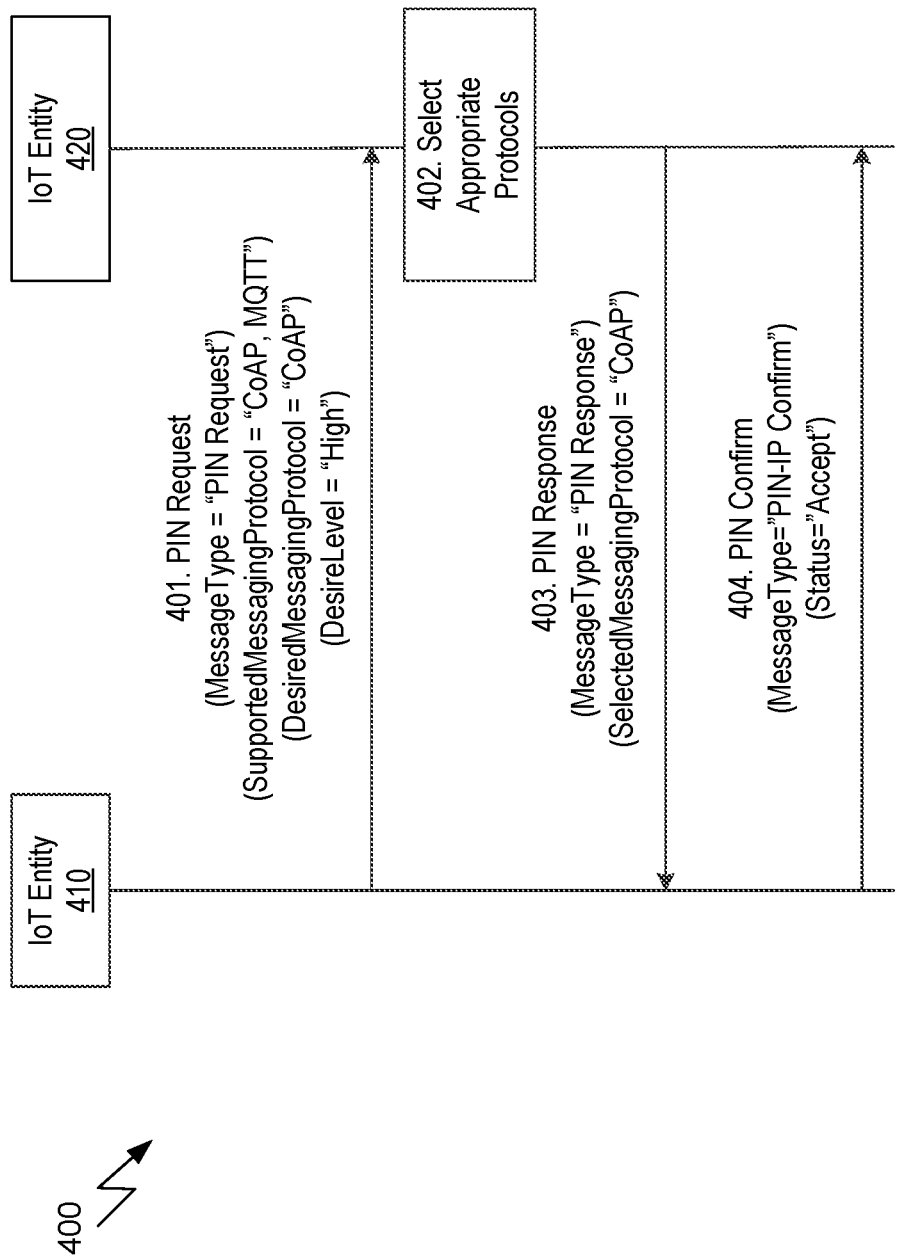
FIG. 4 is an example of a protocol indication and negotiation (PIN) dialogue between IoT entities.

FIG. 4 illustrates an example of a PIN dialogue 400. In message 401, a first IoT entity 410 sends a PIN request to a second IoT entity 420. In the example illustrated, message 1 includes several parameters: message type; supported messaging protocols; desired messaging protocols; and desire levels. In practice, other parameters could additionally or alternatively include: supported and/or desired transport protocols; supported and/or desired combinations of messaging and transport protocols; and desire levels for transport protocols and/or combinations of protocols. Supported messaging and transport protocols are the protocols that entity 1 is presently capable of handling.

In practice, other parameters could also include schedules of times or circumstances where other parameters are applied. For example, an entity may have one set or preferences for business hours or daylight hours, and another for non-work hours or nighttime. Similarly, an entity could specify different preferences to apply to the use of different entity resources, communication via different segments, the type of content, the type of connection available, etc.

The desired messaging and transport protocols are the ones that an entity prefers to use presently. The desired levels express how urgent the preferences are to entity 1 at the moment. Desire levels could be, for example, scaled ratings, e.g., 1 to 5. Alternatively, the desire levels could be named, e.g., no preference, slight preference, strong preference, or necessary.

In step 402, the entity 420 selects appropriate protocols in accordance with which message and transport protocols are supported by both entity 410 and entity 420, and the relative strength of desires that entity 410 and entity 420 may have for using certain protocols. For example, suppose that entity 410 expressed a weak preference to use HTTP, but is also supports CoAP. If entity 420 has a strong preference to use CoAP, e.g., to conserve power, then entity 420 may decide in step 2 that CoAP is the best choice given the capabilities and preferences of both systems.

In message 403, the entity 420 responds to the PIN request 401 from the entity 410. The response includes such parameters as a message type and a selected messaging protocol. Other parameters, not shown, may include a selected transport protocol.

In the example of FIG. 4, the IoT entity 410 confirms the choice made by the entity 420 by sending message 404. The confirmation message 4 includes such parameters as message type and status. Alternatively, the entity 410 could have rejected the selection by entity 420 indicated in the response message 403. For example, entity 1 could have set the status parameter in the confirmation message 404 to "reject," or entity 410 could have sent a new PIN request. However, entity 410 would normally accept whatever entity 420 selects, because entity 420 should be selecting only from a list of what is supported by entity 410.

After the PIN dialogue is completed, the processes in each entity that made the new protocol determination may need to inform other processes in the same entity, such as processes running on other layers, of the new protocols selected. For example, an entity may need to send an internal message to its transport layer to inform that layer of any new transport protocol selected, and send an internal message to the application protocol layer to inform that layer of any new messaging protocol selected.

Figure 5:
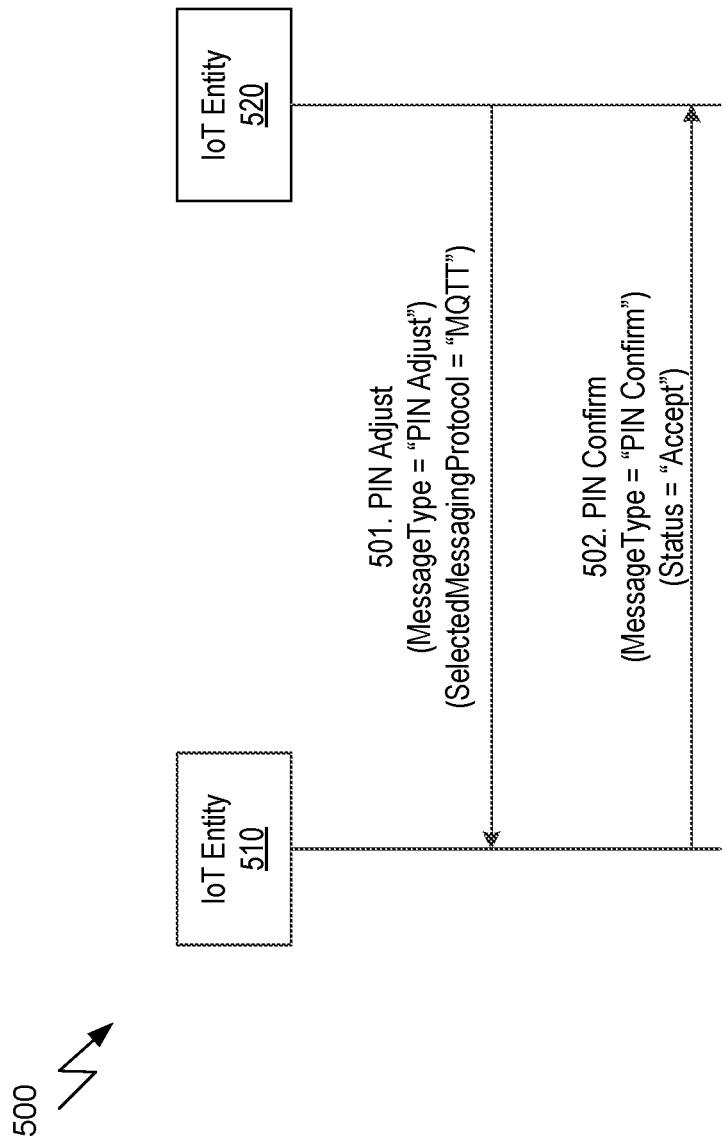
FIG. 5 is an example of a protocol adjustment dialogue.

FIG. 5 illustrates an example of a simpler dialogue 500 by which PIN may be accomplished. Here an IoT entity 520 sends a PIN adjust message 501 to an IoT entity 510. The adjust message contains such parameters as a message type and a selected messaging protocol. Alternatively the adjust message may include a selected combination of messaging and transport protocol, or a selected transport protocol. In this example, the adjust message 501 does not include a list of all messaging and/or transport protocols supported, nor does it include desire level parameters. The IoT entity 510 responds with a confirm message 502 that includes such parameters as message type and status.

As in any implementation of a PIN dialogue, each message may contain any or all of the parameters of the PIN dialogue, and may be tailored to a message type and the circumstances. A PIN request message may, for example, contain an indication of one or more supported message or transport protocols, or combinations thereof. The particular supported protocols may be represented, for example, by name or by an integer, e.g., 1 or UDP, 2 for TCP, etc. For each supported protocol, specific features may be indicated. For example, for transport protocols such features as congestion control, flow control, and retransmission timers may be indicated. For messaging protocols, such features as resource observation, block transfer, piggybacked response, etc., may be indicated. Again, such features may be indicated by name or other means, e.g., an integer.

The PIN request may further include a schedule of when such protocols are supported. The schedule may indicate the times, resources, content, specific entities, connection, and/or other circumstances under which support for the protocols is available. For example, a schedule may indicate that between 10 AM and 6 PM HTTP is supported, and that CoAP is available between 4 PM and 10 AM, (hence both protocols are supported from 4 PM to 6 PM.) Specific entities for whom certain protocols are supported may be indicated, for example, by an identifier such as IP address, unique name, URI, etc., or by an identification of a class of such entities.

A PIN request may further include an indication of one or more desired messages or transport protocols, or combinations thereof. These are protocols that the sender of the PIN request prefers to use. Again, the protocols may be indicated by name or other means, and features of the protocols can be stipulated. Along with indications of which protocols are desired, there may be indications of the relative level of desire. For example, such desires could be expressed as "high" or "low," "strong" or "weak," or along a graduated scale, and could be indicated by name or other means such as an integer.

The PIN request may further include a schedule of when such protocols are desired. The schedule may indicate the times, resources, content, specific entities, connection, and/or other circumstances under which the preference for certain protocols applies.

A PIN response message may include indications as to which protocols are selected, by the entity that has received the PIN request information. One or more protocols or combinations of protocols may be selected, and indications may be provided as to which features of protocols are selected for use with each.

The PIN response may further include a schedule of when such protocols are selected. The schedule may indicate the times, resources, content, specific entities, connection, and/or other circumstances under which the preference for certain protocols applies.

Alternatively, rather than sending a schedule, the sender of the PIN response may send a second PIN response or a PIN adjust message when circumstances change and, therefore, a different protocol is preferred by that entity.

A PIN confirm message may be sent by an entity receiving a PIN response or PIN adjust message. Such a message may include parameters indicating the acceptance or conditional acceptance of the parameters in the PIN response or PIN adjust message, or alternatively express the need for continued negotiation. Normally the selections indicated in a PIN response or PIN adjust message would be drawn from options made available in the PIN request, and therefore would be acceptable to the entity issuing the request.

Example Layer Options for Implementation of PIN

Figure 6:
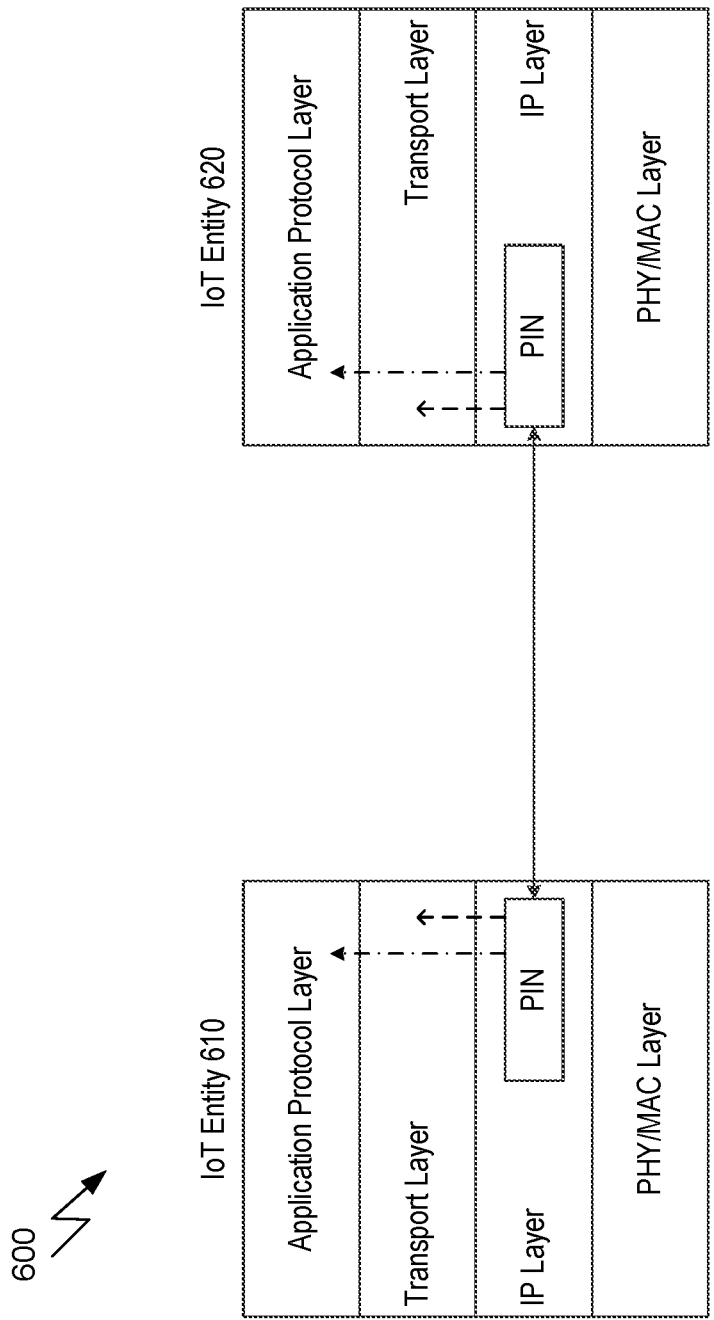
FIG. 6 illustrates communications between layers of IoT entities where a PIN dialogue is accomplished by the IP layer.
Figure 7:
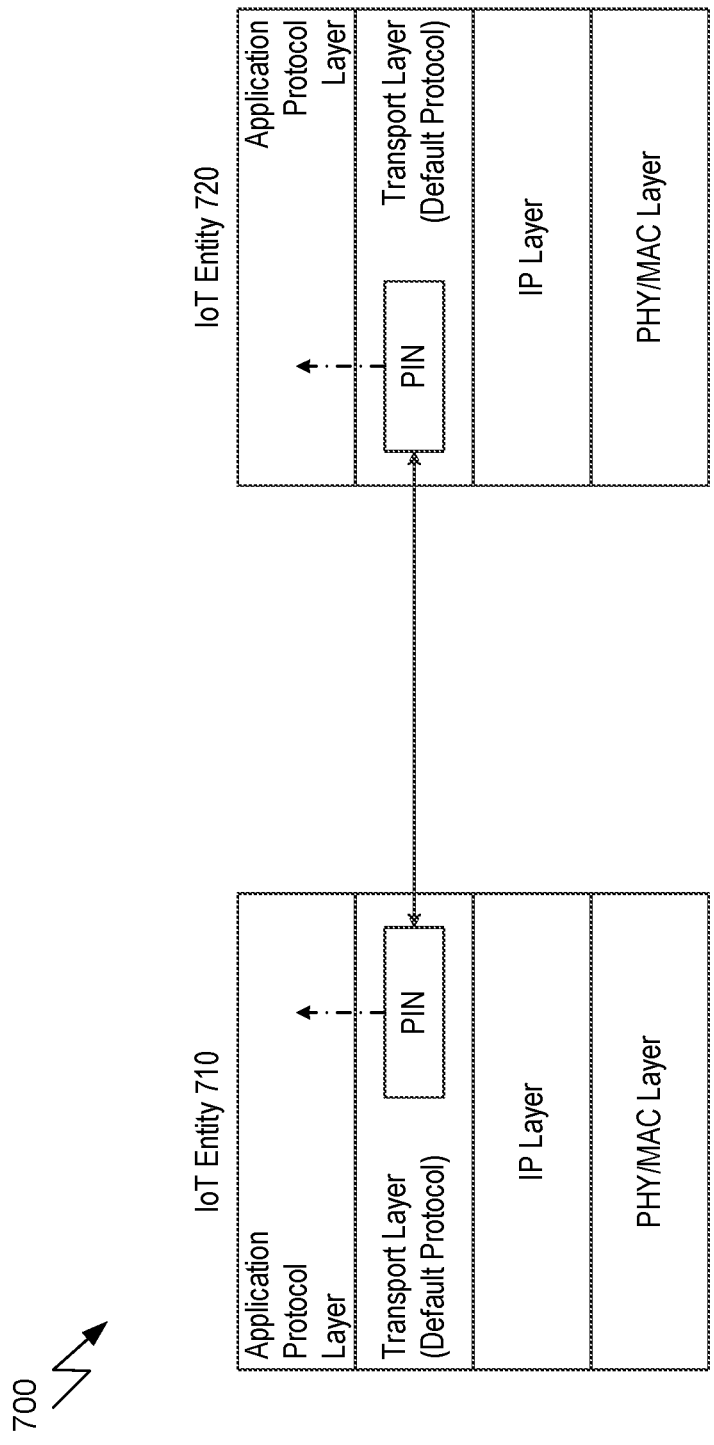
FIG. 7 illustrates communications between layers of IoT entities where a PIN dialogue is accomplished by the transport layer.
Figure 8:
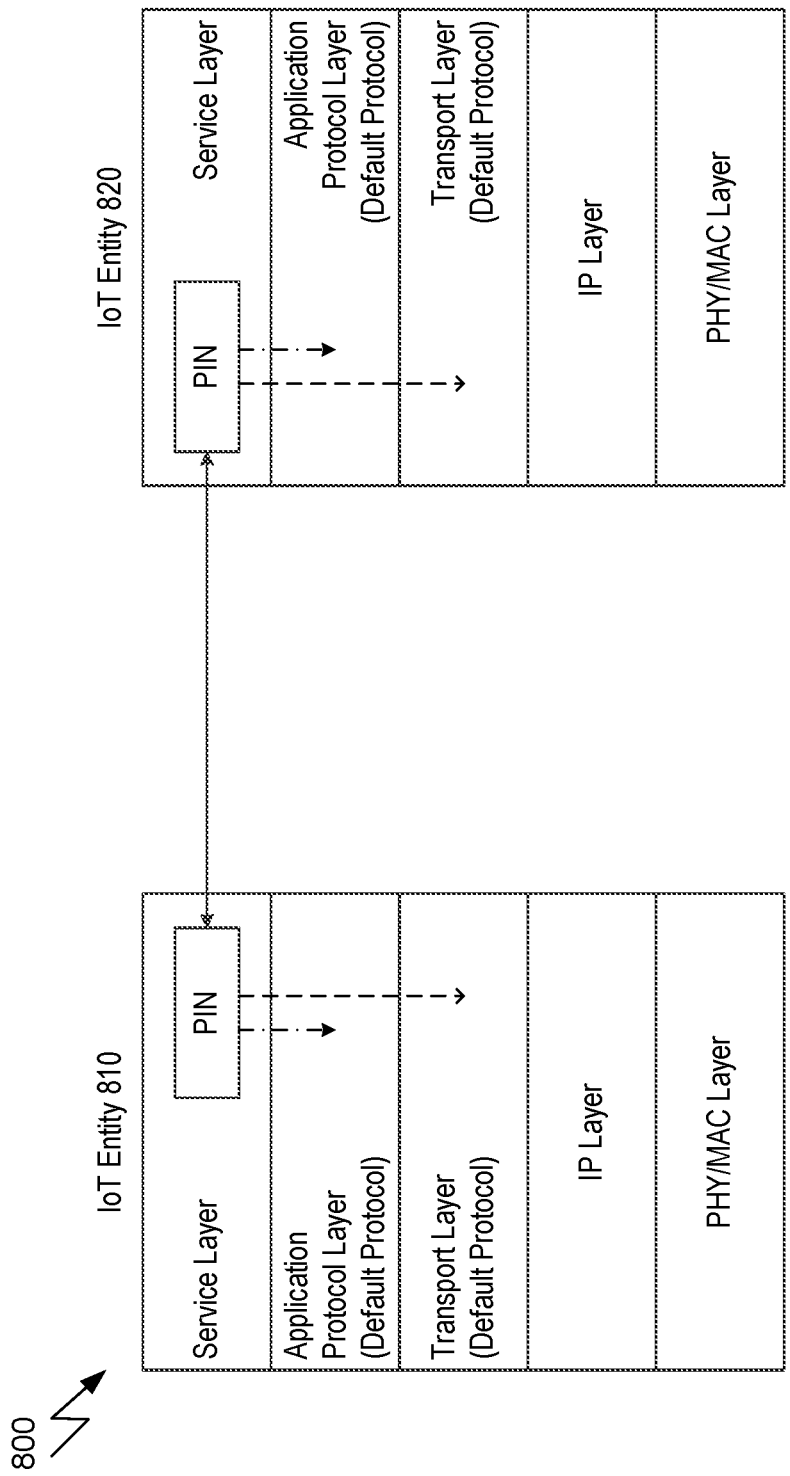
FIG. 8 illustrates communications between layers of IoT entities where a PIN dialogue is accomplished by the service layer.

As shown in FIGS. 6, 7, and 8, a PIN dialogue may be implemented in any of several layers and then affect what occurs in other layers. In the example of FIG. 6, both an IoT Entity 610 and an IoT Entity 620 only need to have an IP layer and a PHY/MAC layer to support PIN procedures for indicating and negotiating transport protocols and messaging protocols between them.

After the PIN procedures are completed at IoT Entity 610 and IoT Entity 620, the PIN functions at each IoT Entity 610 and IoT Entity 620 need to send an internal message to its respective transport layer to inform the new transport protocol if any is selected, and send an internal message to its respective application protocol layer to inform the new messaging protocol if any is selected. For example, as shown in FIG. 6, if a new transport protocol and/or feature of an existing transport protocol is changed/selected, the PIN function in IP layer (at both IoT Entity 1 and IoT Entity 2) sends a TP_Indication( ) message to the transport layer to indicate the new transport protocol or the new features of the existing transport protocol. Similarly, if a new messaging protocol and/or feature of an existing messaging protocol is changed/selected, the PIN function in IP layer (at both IoT Entity 610 and IoT Entity 620) sends an MP_Indication( ) message to the application protocol layer to indicate the new messaging protocol or the new features of the existing messaging protocol.

In this case, each PIN message is an IP packet consisting of an IP header and an IP payload. IPv4 or IPv6 could be used, for example. The "Protocol" field in an IPv4 header can be used to indicate PIN protocol, for example, via a value assigned to identify a PIN protocol by the Internet Assigned Numbers Authority (IANA). The "Next Header" field in IPv6 header could be used to indicate PIN protocol using the value as used for "Protocol" in IPv4.

Again, the payload of an IPv4 or IPv6 message, like any PIN dialogue message, may contain any of the PIN dialogue parameters discussed herein, such as supported, desired, and protocols and features, and schedules of times and circumstances where such parameters apply, in additional to message type identifiers, etc.

A PIN dialogue can also be implemented as ICMP messages. The ICMP message payload may contain the parameters described above, with the "Type" of each message may be set to "PIN request," "PIN response," etc., as appropriate.

In the example of FIG. 7, both IoT Entity 710 and IoT Entity 720 need to have a transport layer, an IP layer and a PHY/MAC layer to support PIN procedures for indicating and negotiating messaging protocols and transport protocols between them. After the PIN procedures are completed, the PIN functions at each IoT Entity 710 and IoT Entity 720 need to send an internal messages to their respective transport layers to inform the new transport protocol, if any is selected, and to send internal messages to their respective application protocol layers to inform the layers of the new messaging protocol, if any.

In this case, a default transport protocol such as UDP or TCP may be used to transmit the PIN messages. Each PIN message is a transport layer packet, e.g. a UDP packet or a TCP packet consisting of a TCP or UDP header and TCP or UDP data. In the header, the "Source Port" and "Destination Port" fields can be used to indicate a PIN protocol. Again, this could be done using a value assigned to identify a PIN protocol by the Internet Assigned Numbers Authority (IANA)

In the example of FIG. 8, both IoT Entity 810 and IoT Entity 820 need to have an application protocol layer, a transport layer, an IP layer and a PHY/MAC layer to support PIN procedures for indicating and negotiating messaging protocols and/or transport protocols between them.

After the PIN procedures are completed, the PIN functions at both IoT Entity 810 and IoT Entity 820 needs to send internal messages to their respective transport layers to inform them of the new transport protocol, if any, and send an internal message to their respective application protocol layers to inform them of the new messaging protocol if any is selected.

In this case, a default message protocol and transport protocol will be used to transmit PIN messages. Each PIN message is a service layer message. For example, each PIN message can be implemented as an oneM2M primitive.

Extensions to Existing Protocols

A PIN dialogue may be implemented as an extension of an existing protocol, such as NDP, DHCP, TCP, TLS/DTLS, RD, and CoAP, etc. This entails a cross-layer approach in which high-layer information about options for a variety of supported, desired, and selected messages and transport protocols is incorporated into messages of the protocols currently in use by two devices. For example, 6LoWPAN NDP is a network layer protocol, but it a PIN dialogue, 6LoWPAN NDP would carry higher-layer (e.g., transport, session, presentation, and/or application layer) protocol information in NDP messages. A special flag may be added in the header of a message to indicate that the message is extended to support a PIN function.

NDP Extension

Figure 9:
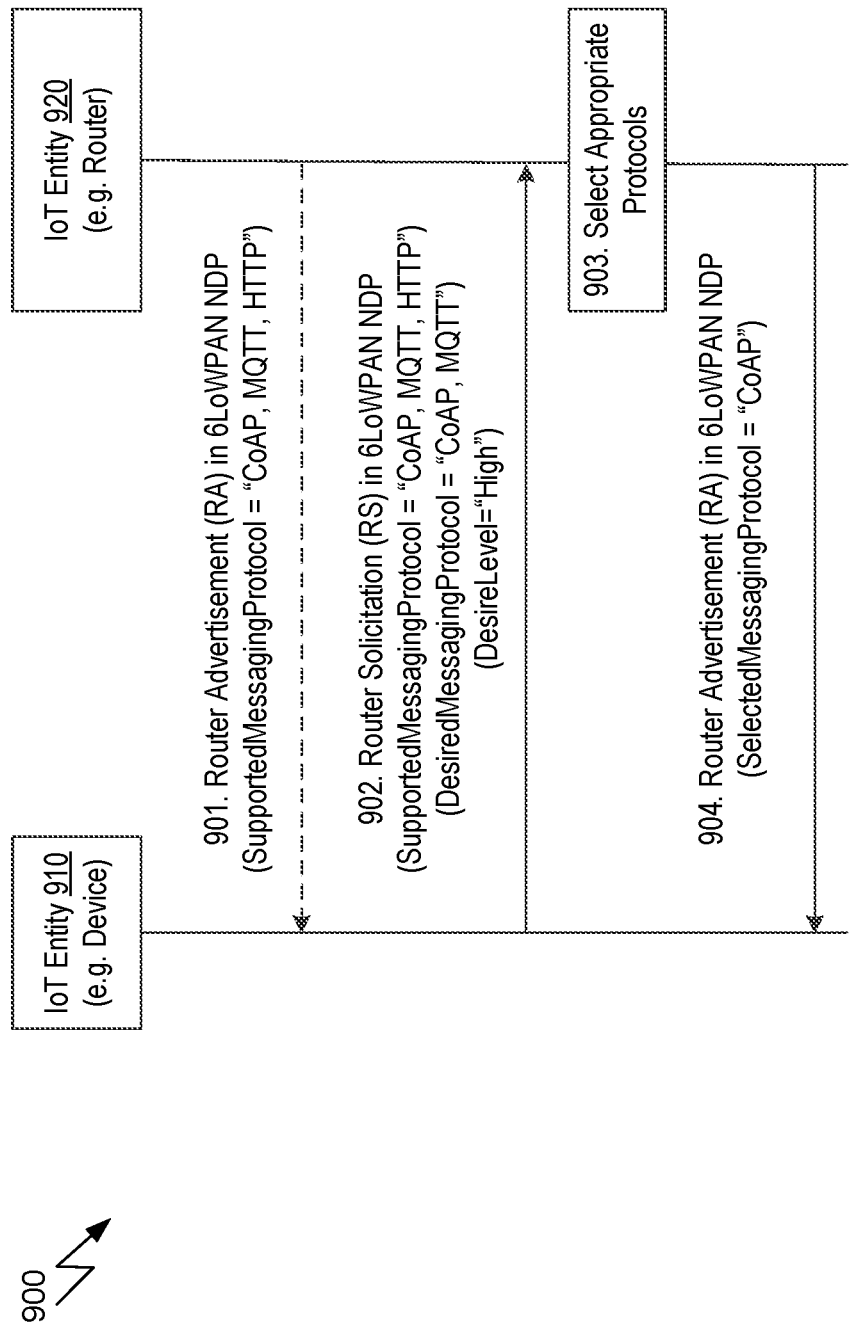
FIG. 9 is an example of a PIN dialogue implemented through extension of the ND protocol.

FIG. 9 illustrates an example of how a PIN dialogue 900 may be implemented as an extension to the Neighbor Discovery Protocol (NDP). 6LoWPAN NDP (IPv6 over Low-Power Wireless Personal Area Networks using NDP), for example, includes Router Advertisement (RA) and Router Solicitation (RS) messages for constrained devices to find their first-hop default router and automatically formulate their unique IPv6 addresses.

In the example of FIG. 9, the IoT entity 910 is a device and the IoT entity 920 is a router. Optionally, the dialogue may begin with the router 920 sending a router advertisement (RA), message 901, that includes one or more supported protocol parameters. Such parameters may include, for example, indications or which messaging and transport protocols, or combinations thereof that the router 920 supports. The device 910 sends a router solicitation (RS), message 902, that includes parameters such as supported messaging and transport protocols that device 910 supports, one or more desired protocols, and desire levels. Message 902 may be tailored in view of an earlier received message 901. In step 903, the router 920 selects appropriate protocols in accordance with which message and transport protocols are supported by both entity 1 and router 920, and the relative strength of desires that device 910 and router 920 may have for using certain protocols. In message 4, the router 920 responds to the PIN request from device 910 with a parameter indicating the selected messaging and/or transport protocol.

As before, after the PIN dialogue is completed, the processes in each entity that made the new protocol determination may need to inform other processes in the same entity, such as processes running on other layers, of the new protocols selected. For example, an entity may need to send an internal message to its transport layer to inform that layer of any new transport protocol selected, and send an internal message to the application protocol layer to inform that layer of any new messaging protocol selected.

TCP Extension

Figure 10:
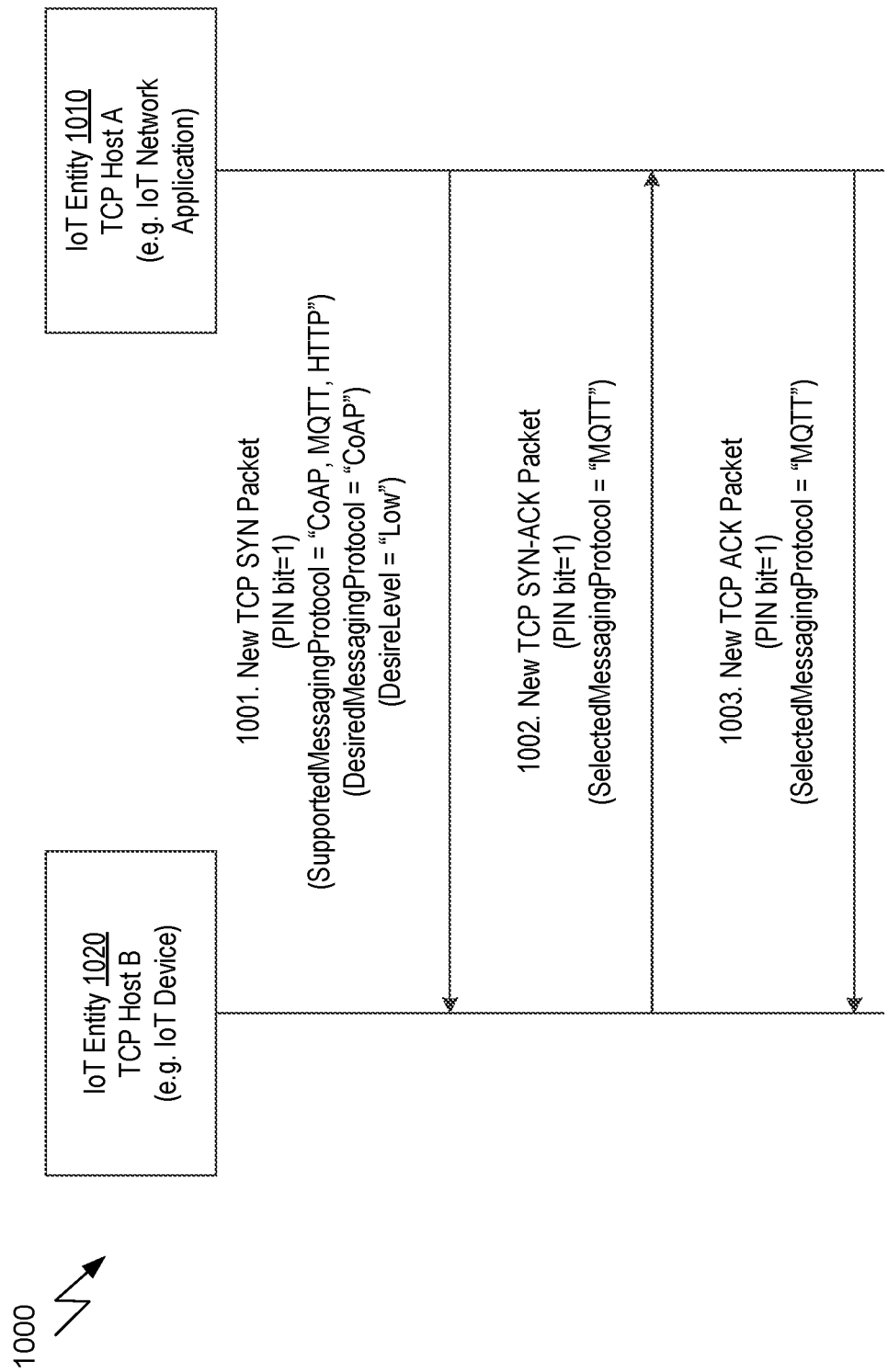
FIG. 10 is an example of a PIN dialogue implemented through extension of the TCP handshake.

FIG. 10 illustrates an example of how a PIN dialogue 1000 may be implemented as an extension to the Transmission Control Protocol (TCP). In this example, the IoT entity 1010, Host A, is an IoT network application, and the IoT entity 1020, Host B, is an IoT device. Host A 1010 sends a new TCP SYN packet, message 1001, to Host B 1020. In this example, message 1001 parameters include a PIN bit, a list of supported messaging protocols, a desired messaging protocol, and a desire level. Again, in practice such a PIN dialogue message 1001 could additionally or alternatively include transport protocol and protocol combination parameters, such as transport protocols support, transport protocols desired, and the level of desire for transport protocols, etc. In a step not shown, Host B 1020 selects appropriate protocols in accordance with which message and transport protocols are supported by both Host A 1010 and Host B 1020, etc. In message 1002, Host B 1020 responds to the PIN request of the TCP SYN packet message 1001 by sending a new TCP SYN-ACK packet, message 1002, to Host A 1010. Message 1002 parameters include a PIN bit, and an indication of the protocols selected. Host A 1010 responds to message 1002 by sending a new TCP ACK Packet, message 1003, to Host B 1020. Like message 1002, message three parameters include a PIN bit and an indication of the protocols selected.

As before, after the PIN dialogue is completed, the processes in each entity that made the new protocol determination may need to inform other processes in the same entity, such as processes running on other layers, of the new protocols selected. For example, an entity may need to send an internal message to its transport layer to inform that layer of any new transport protocol selected, and send an internal message to the application protocol layer to inform that layer of any new messaging protocol selected.

TLS/DTLS Extension

Figure 11:
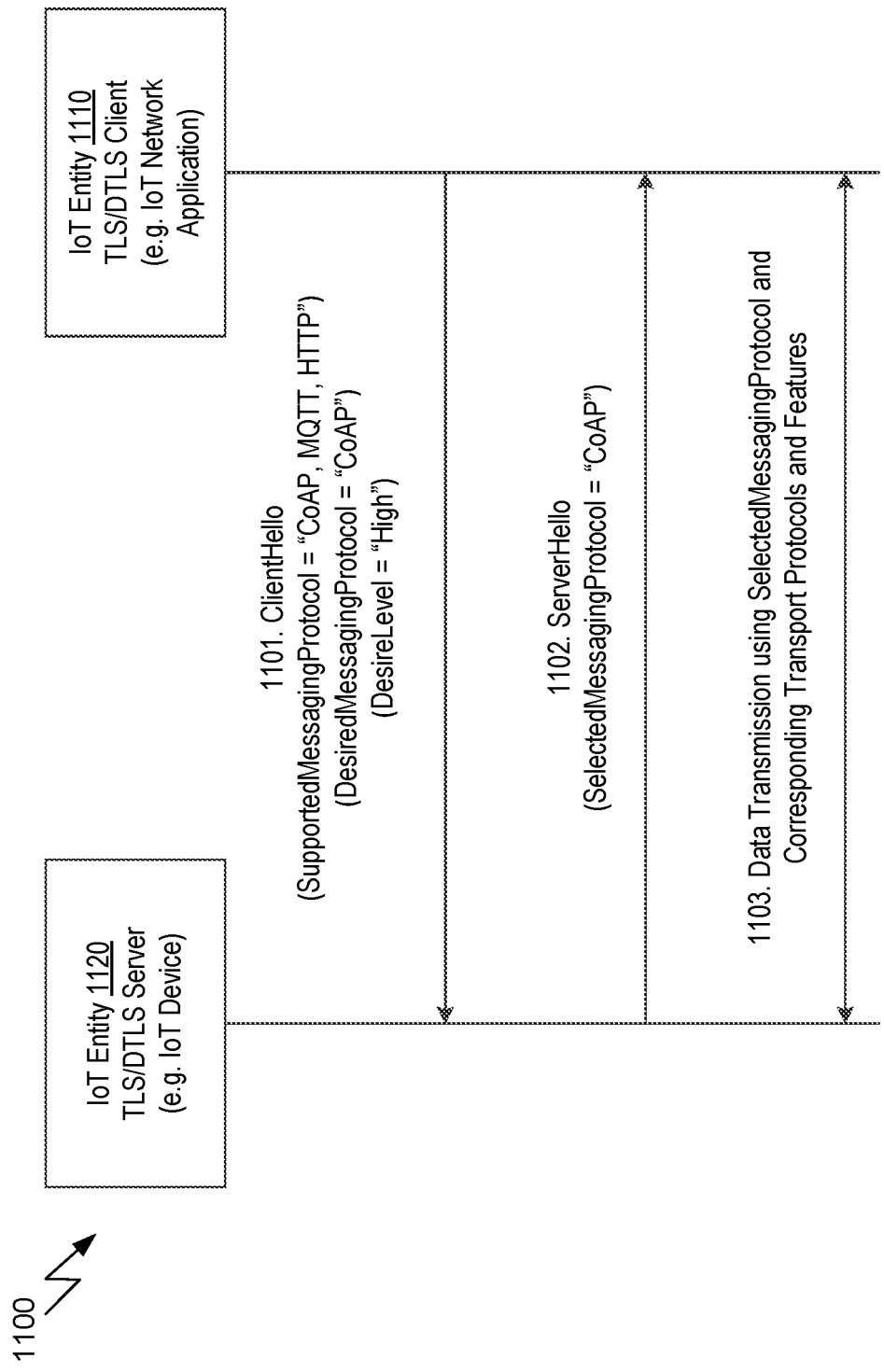
FIG. 11 is an example of a PIN dialogue implemented through extension of the TLS/DTLS handshake.

FIG. 11 illustrates an example of how a PIN dialogue 1100 may be implemented as an extension to the Transport Layer Security/Datagram Transport Layer Security (TLS/DTLS) protocol. In this example, the IoT entity 1110 is a TLS/DTLS client, such as a network application. The IoT entity 1120 is a TLS/DTLS server, such as a IoT device. As shown, the PIN dialogue may be implemented as an extension to the TLS/DTLS handshake. The client 1110 begins the dialogue by sending a ClientHello 1101 to the server 1120. The ClientHello 1101 includes parameters regarding: one or more supported protocols, such as messaging and transport protocols, or combinations thereof, that the client 1110 supports; one or more desired protocols or combinations of protocols; and desire levels. In a step not shown, the server 1120 selects appropriate protocols in accordance with which message and transport protocols are supported by both client 1110 and server 1120, and the relative strength of desires that client 1110 and server 1120 may have for using certain protocols. The server 1120 then sends a ServerHello message 1102 to the client 1110 with a parameter indicating the selected messaging and/or transport protocol. Thereafter the client 1110 may begin data transmission using the selected messaging protocol and corresponding transport protocol.

As before, after the PIN dialogue is completed, the processes in each entity that made the new protocol determination may need to inform other processes in the same entity, such as processes running on other layers, of the new protocols selected.

DHCP Extension

Figure 12:
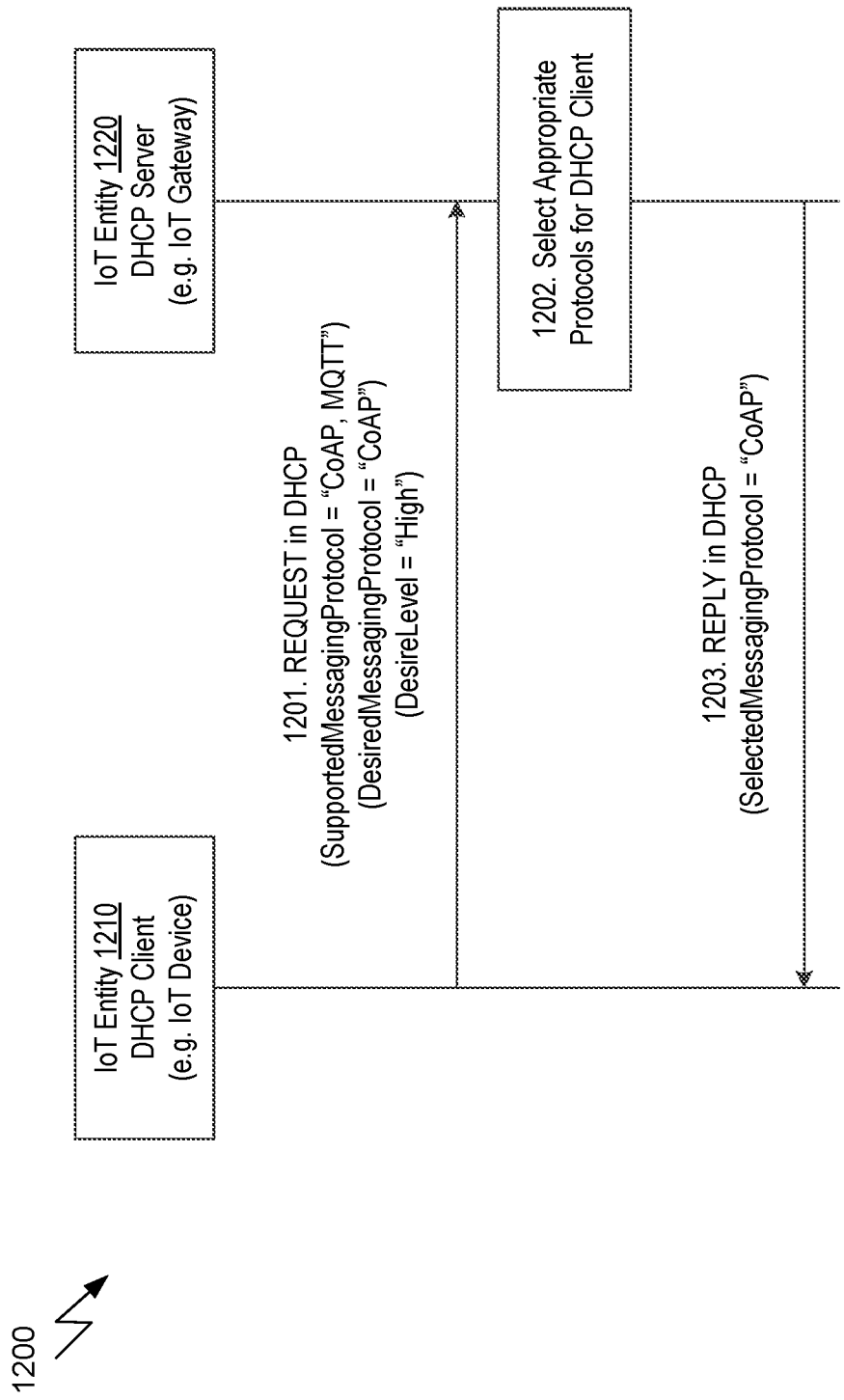
FIG. 12 is an example of a PIN dialogue implemented through extension of DHCP.

FIG. 12 illustrates an example of how a PIN dialogue may be implemented as an extension to the Dynamic Host Configuration Protocol (DHCP). Such an extension may be useful, for example, in local area networks such as a 6LoWPAN (Internet Protocol version 6 over Low power Wireless Personal Area Network.) In this example, the IoT entity 1210 is a DHCP client and the IoT entity 1220 is a DHCP server. The client 1210 begins the dialogue by sending a Request 1201 to the server 1220. The Request 1201 includes one or more supported protocol parameters, such as indications of which messaging and transport protocols, or combinations thereof that the client 1210 supports, one or more desired protocols or combinations of protocols, and desire levels. In step 1202, the server 1220 selects appropriate protocols in accordance with which message and transport protocols are supported by both client 1210 and server 1220, and the relative strength of desires that client 1210 and server 1220 may have for using certain protocols. The server 1220 then sends a Reply 1203 to the client 1210 with a parameter indicating the selected messaging and/or transport protocol.

As before, after the PIN dialogue is completed, the processes in each entity that made the new protocol determination may need to inform other processes in the same entity, such as processes running on other layers, of the new protocols selected.

RD Extension

The Constrained RESTful Environments (CoRE) Link Format specification covers a link format for use by constrained web servers to describe hosted resources, their attributes, and other relationships between links. Among these hosted resources are resources provided on constrained devices (e.g., endpoints.) A constrained device registers its resources, including the attributes of each resources, on a Resource Directory (RD) so that other devices or applications can discover the resources via the RD.

Protocol indication and negotiation (PIN) can be accomplished by extending the RD resource registration process to support describing transport protocols and messaging protocols for each resource being registered. For example, a new link attribute Transport Protocol (tp) could indicate the transport protocol for accessing the corresponding resource. If the transport protocol (e.g. TCP and DCCP) has different versions or profiles, the tp attribute could also indicate the version or profile of the transport protocol to be used for the resource. For example, either TCP or DCCP could be indicated by the tp attribute. Similarly a new link attribute Messaging Protocol (mp) could indicate the messaging protocol for accessing the corresponding resource. Again, if the messaging protocol has different versions or profiles, the mp attribute could indicate its version or profile. For example, messaging protocols such as CoAP, HTTP, MQTT, XMPP, or AMQP, etc., could be indicated by the mp attribute.

Figure 13:
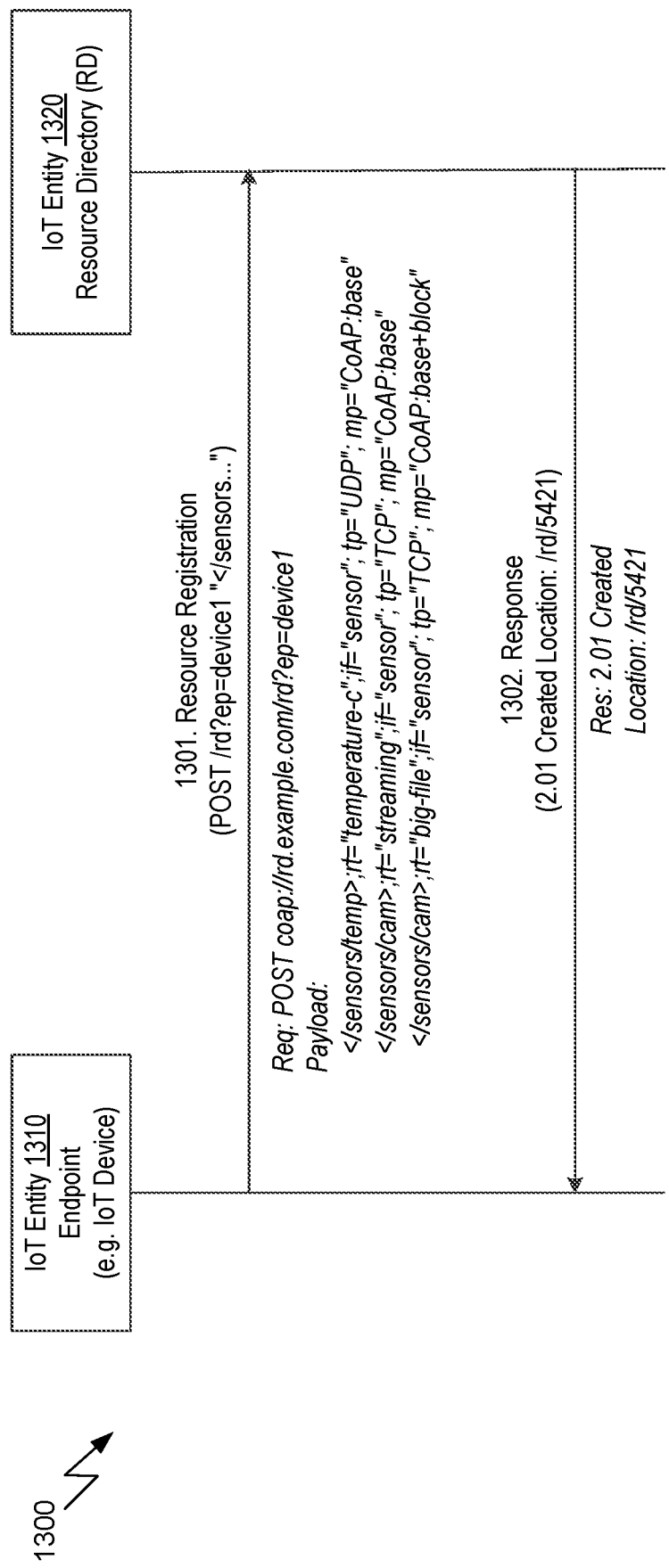
FIG. 13 is an example of a PIN dialogue implemented through extension of RD.

FIG. 13 illustrates an example procedure of an extended resource registration supporting a protocol indication function. In this example, the IoT entity 1310 is an endpoint, such as an Iot device. The IoT entity 1320 is a resource directory (RD). The endpoint 1310 sends a resource registration message 1301 to the RD 1320. This message contains a list of resources to be registered. Each resource has its link format description (i.e. link attributes). In this example, there is a temperature sensor with a resource entry /sensors/temp a resource type (rt) attribute of "temperature-c", a transport protocol (tp) attribute of "UDP", and a messaging protocol (mp) attribute of "CoAP:base" (i.e. the base CoAP protocol). There is also a camera which can be accessed in two ways. There is an entry for /sensors/cam where the rt is "streaming", the tp is "TCP", and the mp is "CoAP:base". There is a second entry for the /sensor/scam resource where the rt is "big-file", the tp is "TCP", and the mp is "CoAP:base+block" (i.e. the base CoAP protocol plus block transfer support). The RD 1320 acknowledges receipt of the registry entries by sending a response message 1302 to the endpoint 1310. Afterward the RD may notify the endpoint of the chosen protocols to be used for communication with the client.

The tp and mp attributes allow a client (e.g. an IoT application) to issue discovery queries to an RD, such as queries to discover endpoints and/or resources which can be accessed using a particular transport protocol and/or messaging protocol.

FIG. 13 only shows a protocol indication function. In practice, an RD may act as an agent facilitating full PIN dialogues between endpoints and the client. For example, an endpoint may report its supported protocols and preferred protocols to a client, and then the client may negotiate with the RD about appropriate protocols for the endpoint, using the same messages or kinds of messages described elsewhere herein.

COAP Extension

The Constrained Application Protocol (CoAP) allows relatively simple electronic devices to communicate interactively over the Internet. It includes a variety of features, such as resource observation, block transfer, congestion control. CoAP can run on top of a number of transport protocols, such as UDP, TCP, and WebSocket. Therefore devices or resources may use different CoAP features with different transport protocols.

A protocol indication function may be supported in CoAP through the use of a CoAP ".profile" associated with a CoAP client. This would allow CoAP entities to dynamically indicate and adjust CoAP features and transport protocols. For example, the CoAP profile could include parameters indicating supported and/or desired network features and transport protocols to be applied at different times for different entity resources, and the strength of desires if any. A resource list parameter could indicate a set of resources for which the other parameters of the profile apply. A feature parameter could indicate, for instance, the use of base (i.e. normal CRUD (Create, Retrieve, Update, Delete) in CoAP base protocol), block transfer, resource observe, and/or congestion control, etc. A transport protocol could indicate that UDP, TCP, Web Socket, or other supported protocol should be used. A schedule parameter could be used to time or times during which the other parameters are to apply.

Figure 14:
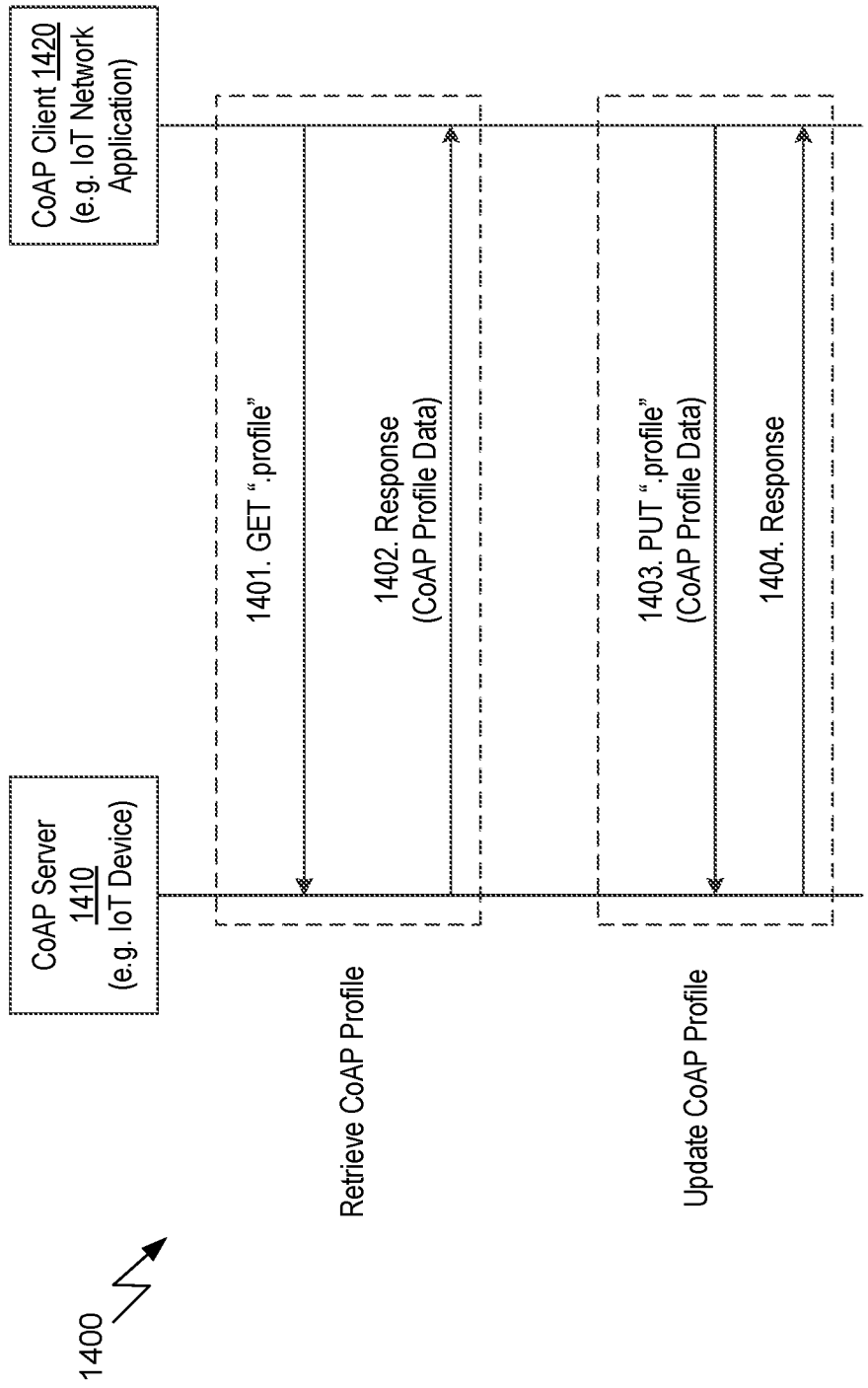
FIG. 14 is an example of a PIN dialogue implemented through extension of CoAP.

FIG. 14 illustrates example procedures for retrieving and updating a CoAP profile by which a PIN dialogue may be supported. In this example, there are two entities. The first is a server 1410, such as a IoT device. The second is a client 1420, such as an IoT network application.

To retrieve a CoAP profile, the client 1420 sends a GET ".profile" message 1 to server 1410. The server 1410 responds in a response message 2 which contains CoAP profile data parameters, such as: resource list; schedules; supported and/or desired network features and/or transport protocols; and level of desire for preferred parameters. The client 1420 may send an acknowledgement message back to server 1410 after receiving the response in a message not shown in FIG. 14. Through messages 1 and 2, the server 1410 has indicated its protocol preferences to the client 1420.

To update a CoAP profile, the client 1420 sends a PUT (or POST) ".profile" message 3 to the CoAP profile. This message contains new CoAP profile data corresponding to the parameters that are accepted and/or preferred by the client 1420. Through this message, the client 1420, has indicated its protocol preferences relative to options available to it.

The server 1410 has several options in formulating a response message 4 to be sent back to client 1420. The server 1410 could reject the profile contained in message 3. If this is the case, the server 1410 has two options. First, it may resend the original profile included in message 1401. Second, it may generate and send a new profile, perhaps taking into account the preferences indicated by the client 1420. In either case, the server 1410 includes a profile in the response message 1404 sent back to the client 1420. If client 1420 is satisfied with the profile contained in message 1404, it can just send back an acknowledgement message to server 1410 to signify agreement. If the client 1420 is not satisfied with a new or old CoAP profile included in message 1404, it can repeat Step 1403 to suggest another CoAP profile.

Alternatively, if server 1410 is satisfied with the CoAP profile contained in message 3, it may simply send the response message 4 to the client 1420 without any payload as an acknowledgement to signify agreement.

A CoAP client may alternatively use the CoAP observe mechanism to create a subscription to any change to the resource ".profile" at a CoAP Server. Whenever a CoAP Server's CoAP profile changes, then CoAP Client will receive an automatic notification from the CoAP Server.

As another option, a new CoAP Profile header option is proposed to exchange CoAP profile information between CoAP clients and the CoAP server. The CoAP profile header option will follow the standard CoAP header option format, but it basically includes three parameters (i.e. Feature, Transport Protocol, and Resource List). The CoAP Profile header option can be exchanged between CoAP client and CoAP server as needed, e.g. during normal resource operations using Create, Retrieve, Update and Delete operations (CRUD).

COAP Intermediary Example

Figure 15:
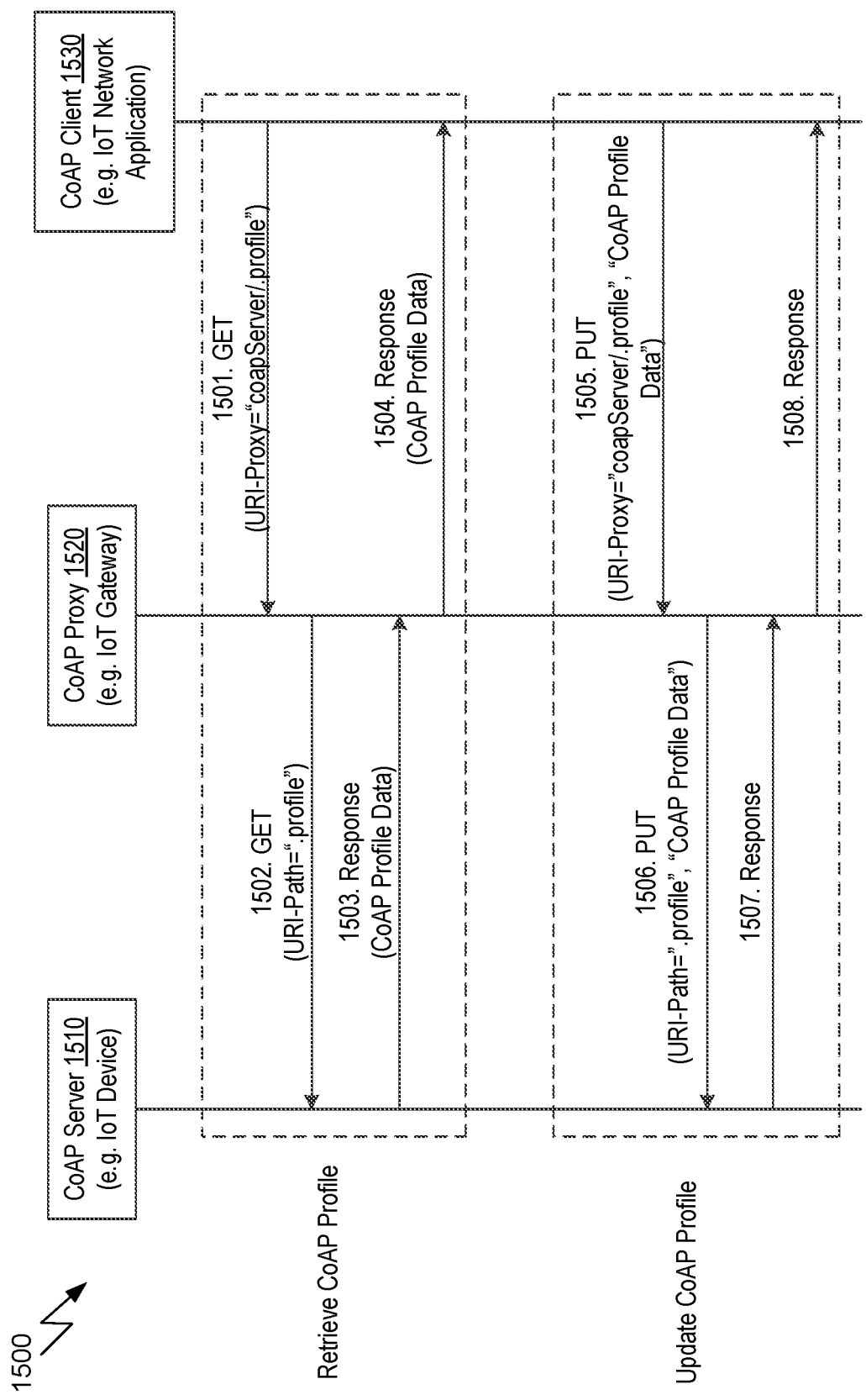
FIG. 15 is an example of a PIN dialogue implemented through a CoAP proxy.

FIG. 15 illustrates example procedures 1500 for retrieving and updating a CoAP profile by which a PIN dialogue may be supported. In this example, there are three entities. The first is a CoAP server 1510, such as an IoT device. The second is a CoAP proxy 1520, such as a IoT gateway. The third is a CoAP client 1530, such as an IoT network application.

To retrieve a CoAP profile, the client 1530 sends a GET .profile message 1501 to proxy 1520. Message 1501 includes a URI-Proxy option to indicate the ".profile" address on CoAP Server (i.e. "coapServer/.profile"). Therefore the proxy 1520 sends a GET .profile message 1502 to the server 1510. Message 1502 is similar to message 1501, however the URI-Path changed to ".profile" from "coap-Server/.profile". The server 1510 then sends a response message 1503 which contains CoAP .profile data parameters, such as those discussed above in reference to FIG. 14. The proxy 1520 forwards the response to the client 1530.

Alternatively, if the proxy 1520 already knows the CoAP profile at of server 1510 at the time that the proxy 1520 receives message 1501, then the proxy B, skip the steps of sending message 1502 to the server 1510 and waiting for the response message 1503. In such a case, the proxy B may just send the known profile back to client 1530 in message 1504.

To update a CoAP profile, the client 1530 sends a PUT (or POST).profile message 1505 to the proxy 1520. Message 1505 contains a URI-Proxy configured to "coapServer/.profile". This message contains new CoAP profile data corresponding to the parameters that are accepted and/or preferred by the client 1530. Through this message, the client 1530, has indicated its protocol preferences relative to options available to it.

The proxy 1520 forwards this new profile to the server 1510 in message 1506. Message 1506 is similar to message 1501, however the URI-Path is changed to ".profile" from "coapServer/.profile". The server 1510 sends a PIN response message 1507 back to the proxy 1520, and the proxy 1520 sends the response back to the client 1530.

Again, the server 1510 has several options in formulating a response message 1507 to be sent back to the client 1530 via the proxy 1520. The server 1510 could reject the profile and reply by resending the original profile or generate a new profile. Normally, the server 1510 will simply the response message 1507 without any payload as an acknowledgement to signify agreement.

Example Graphical User Interface

FIG. 16 shows an example graphical user interface (GUI) screen 1600 that may be supported by an M2M/WoT/IoT entity, such as a device, gateways, and/or a servers, to display and/or configure parameters related to protocol indication and negotiation for that entity or another entity. In the example of FIG. 16, the settings relate to the selection of a messaging protocol and its corresponding transport protocol. The user has indicated that three messaging protocols and their corresponding transport protocols are supported. The user has further indicated that two of the three supported messaging protocols are preferred, and specified a relative preference between those two protocols. The status of which messaging protocol is currently in use is also displayed. For example, "CoAP (UDP)" indicates that the selected messaging protocol is CoAP and corresponding transport protocol is UDP.

In practice, many more messaging protocol options may be available, depending on the particular IoT entity. Similarly, many options may be available as to other aspects of communications, such as application and transport layer protocol options, and/or combinations of protocols made up of selections for the network, transport, and application layer operations. The context-aware procedures described herein may be observed and controlled by user in a number of ways via GUIs. For example, the conditions under which the use of a messaging protocol or combination of messaging protocols is desired may be expressed in a table entered or modified via a GUI. Similarly, a GUI may be used to enter threshold conditions for changing protocols, and/or relative preferences among available choices, and any other context information pertinent to context-aware protocol selection.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 17:
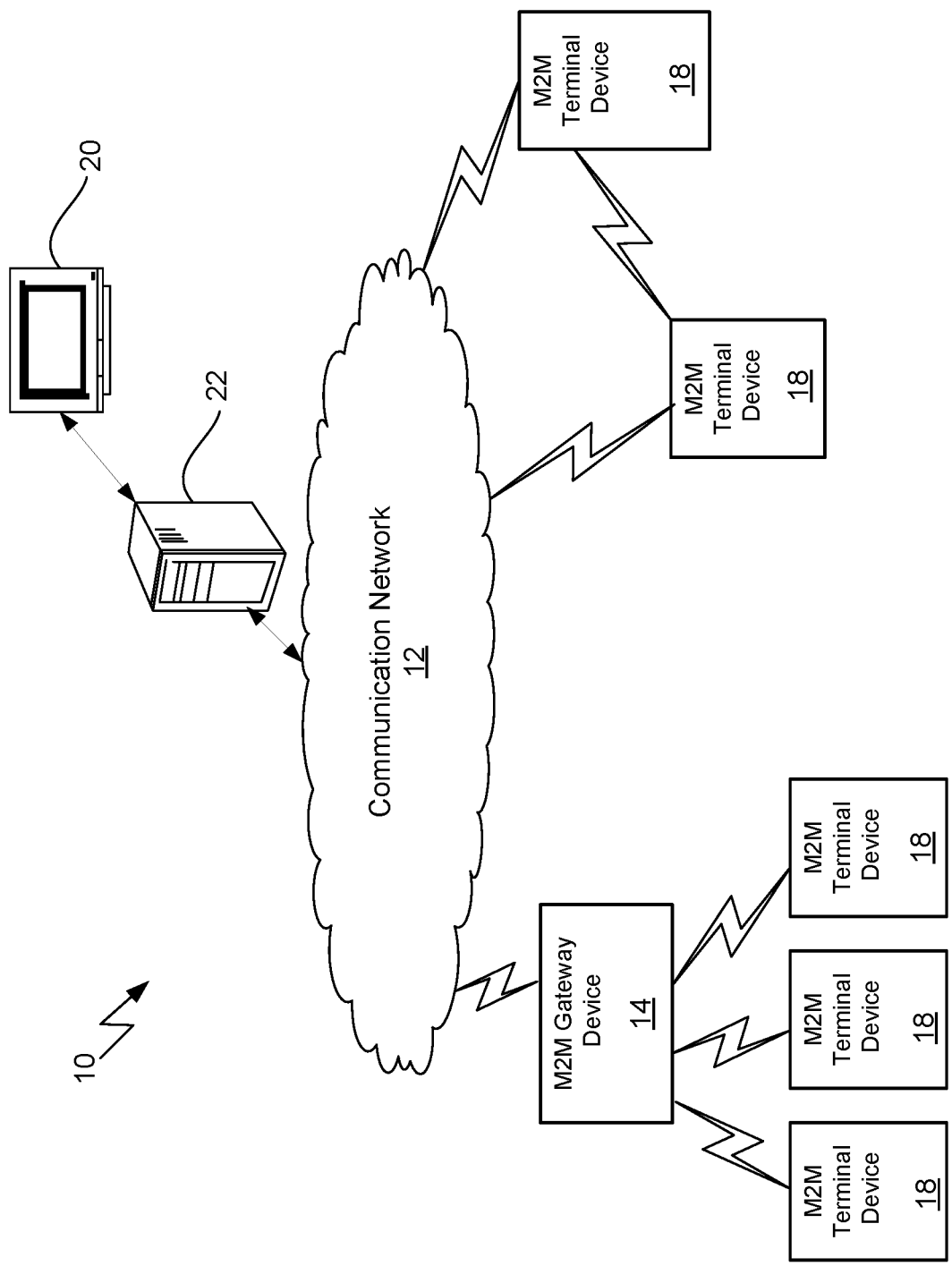
FIG. 17 is a system diagram of an example machine-to-machine (M2M), Internet of Things (IoT), or Web of Things (WoT) communication system in which one or more disclosed embodiments may be implemented.

FIG. 17 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Any of the client, proxy, or server devices illustrated in any of FIGS. 4-15 may comprise a node of a communication system such as the one illustrated in FIGS. 2, 3, 16, and/or 17.

As shown in FIG. 17, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 17, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 18:
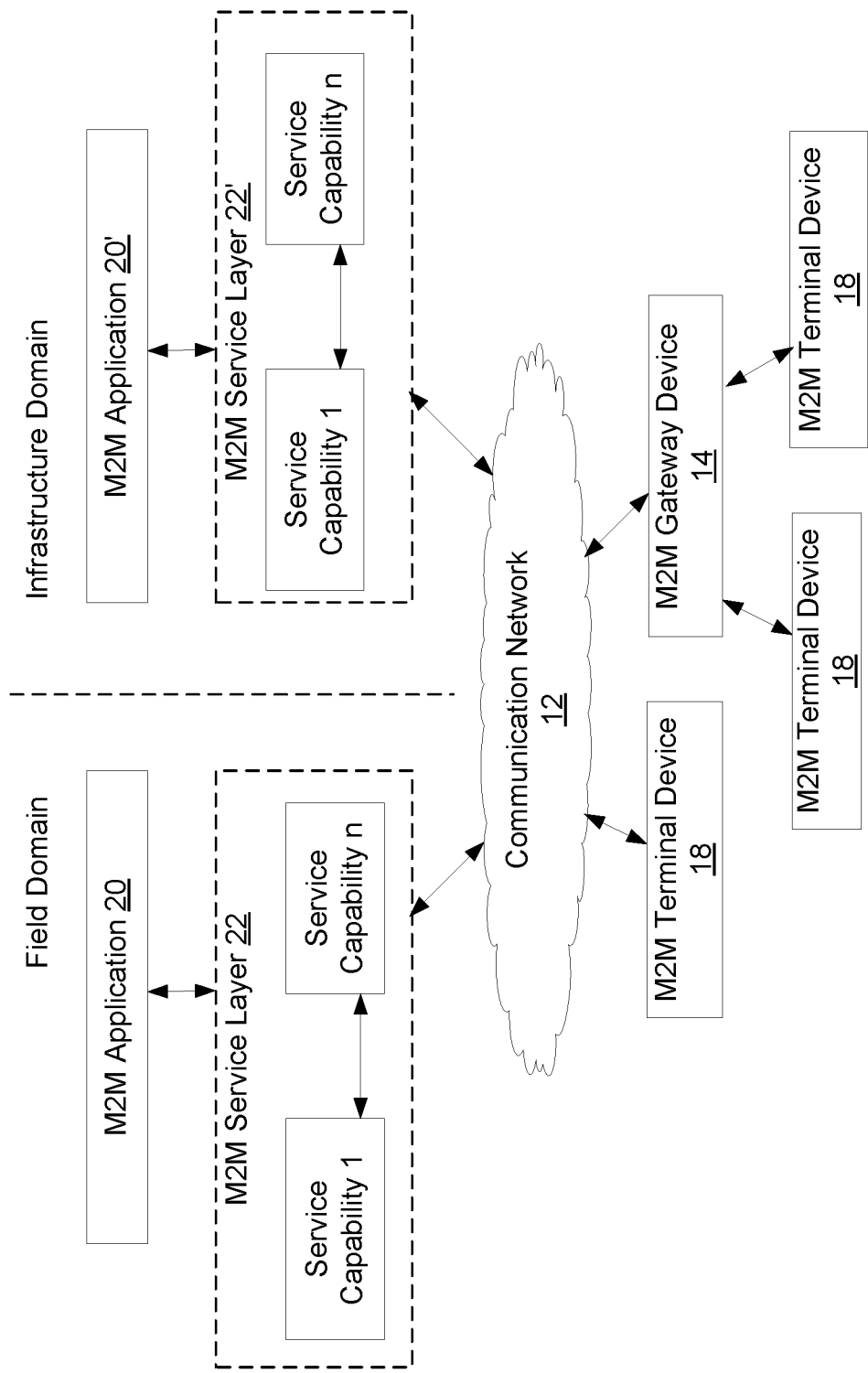
FIG. 18 is a system diagram of an example architecture that may be used within the M2M/IoT/WoT communications system illustrated in FIG. 17.

Referring to FIG. 18, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprises servers, computers, devices, virtual machines (e.g., cloud computing/storage farms, etc.) or the like.

Referring also to FIG. 18, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 16 and 17, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 19 or FIG. 20 described below.

Further, the methods and functionalities described herein may be implemented as part of an M2M network that uses a Service Oriented Architecture (SOA) and/or a Resource-Oriented Architecture (ROA) to access services.

Figure 19:
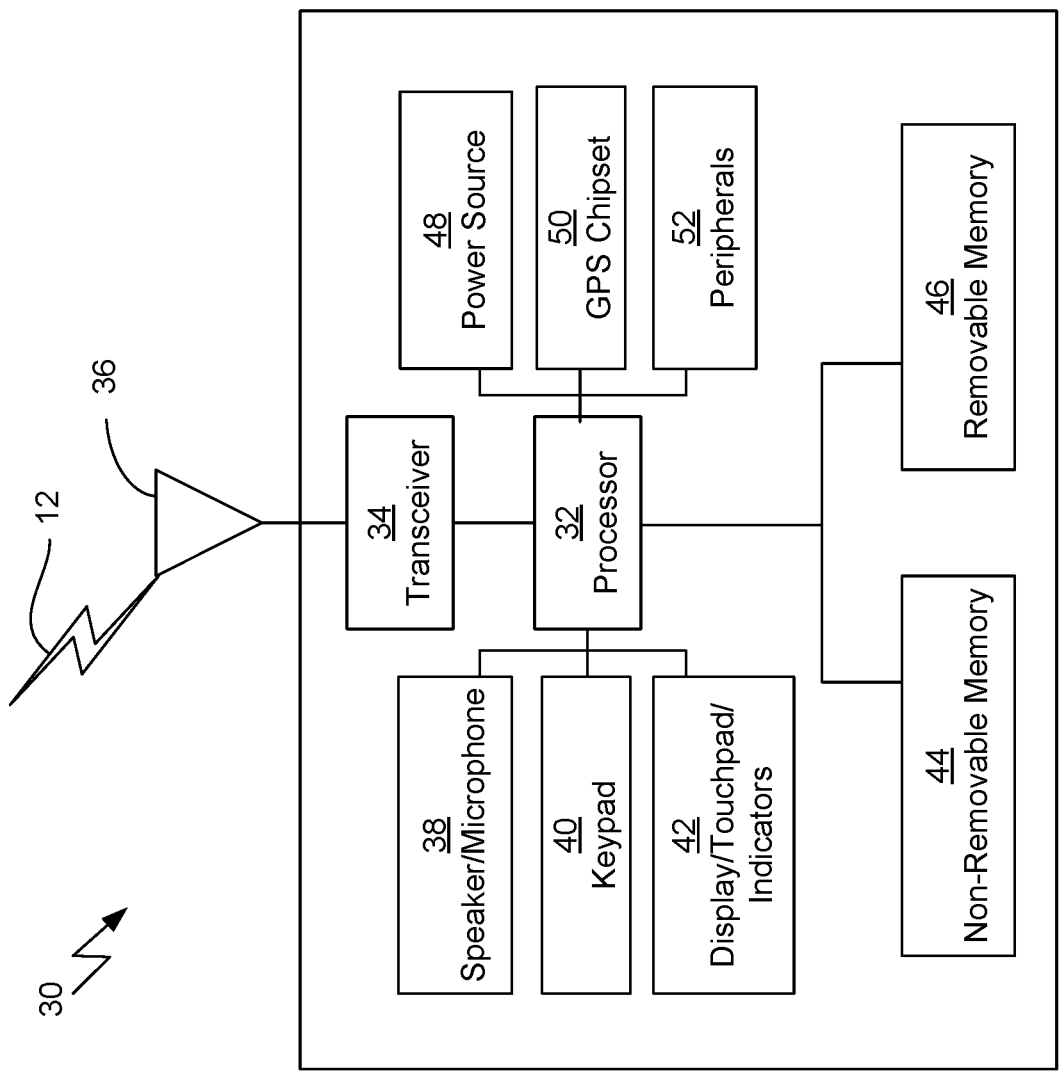
FIG. 19 is a system diagram of an example communication network node, such as an M2M/IoT/WoT device, gateway, or server that may be used within the communications system illustrated in FIGS. 16 and 17.

FIG. 19 is a block diagram of an example hardware/software architecture of a node of a network, such as one of the clients, servers, or proxies illustrated in FIGS. 4-15 which may operate as an M2M server, gateway, device, or other node in an M2M network such as that illustrated in FIGS. 2, 3, 16, and 17. As shown in FIG. 19, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the protocol indication and negotiation steps herein, e.g., in relation to FIGS. 4-15, and in the claims.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 19, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the protocol indication and negotiation steps herein, e.g., in relation to FIGS. 4-15, and in the claims. While FIG. 19 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 19 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20:
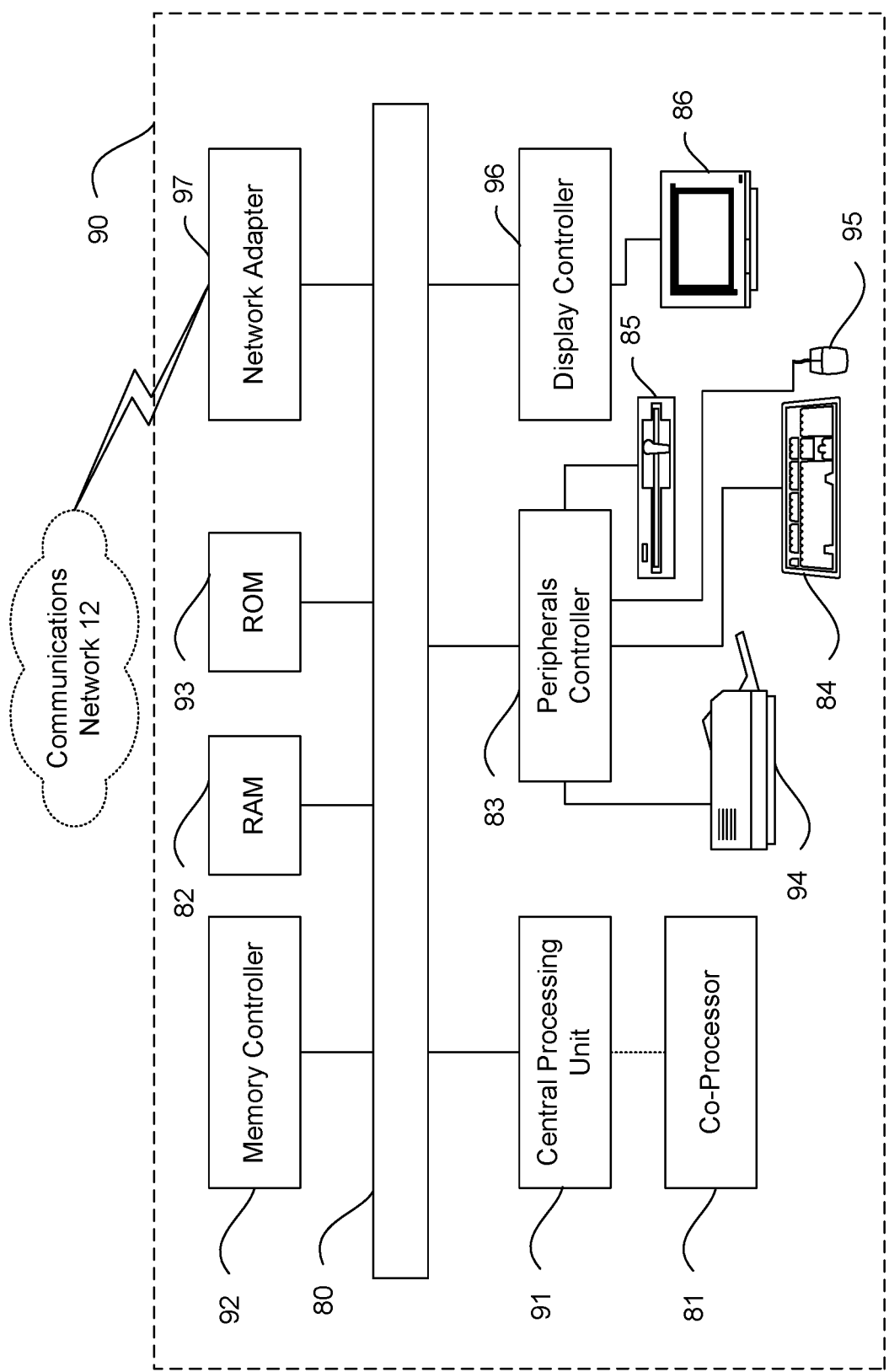
FIG. 20 is a block diagram of an example computing system in which a node of the communication system of FIGS. 16 and 17 may be embodied.

FIG. 20 is a block diagram of an exemplary computing system 90 which may also be used to implement one or more nodes of a network, such as the clients, servers, or proxies illustrated in FIGS. 4-15, which may operate as an M2M server, gateway, device, or other node in an M2M network such as that illustrated in FIGS. 2, 3, 16, and 17. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 17 and FIG. 18, to enable the computing system 90 to communicate with other nodes of the network. The communication circuitry, alone or in combination with the CPU 91, may be used to perform the protocol indication and negotiation steps herein, e.g., in relation to FIGS. 4-15, and in the claims.

FIGS. 4-15, the descriptions thereof, and the claims herein illustrate various embodiments of methods and apparatus for enabling protocol indication and negotiation. In these figures, various steps or operations are shown being performed by one or more clients, servers, and/or proxies. It is understood that the clients, servers, and proxies illustrated in these figures may represent logical entities in a communication network and may be implemented in the form of software (i.e., computer-executable instructions) stored in a memory of, and executing on a processor of, a node of such network, which may comprise one of the general architectures illustrated in FIG. 16 or 17 as described herein. That is, the methods illustrated in FIGS. 4-15 and the claims may be implemented in the form of software (i.e., computer-executable instructions) stored in a memory of a network node, such as for example the node or computer system illustrated in FIG. 18 or 19, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 18 and 19 respectively) of the node under control of the processor of the node and the computer-executable instructions (e.g., software) that it executes.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. An apparatus implementing an IoT resource directory, the apparatus comprising a processor, a memory, and communication circuitry, the apparatus being connected to a communications network via its communication circuitry, the apparatus further comprising computer-executable instructions stored in the memory which, when executed by the processor, cause the apparatus resource directory to:
receive, from a first IoT endpoint, a first resource registration request comprising a first set of communication protocol preferences for a first resource hosted on the first IoT endpoint, the first set of communication protocols preferences comprising two or more options for a messaging protocol and/or a transport protocol to be used for the first resource;
receive, from a second IoT endpoint, a first resource discovery request comprising criteria for discovering a first needed resource;
determine, based on the first resource discovery request, that the first resource is needed by the second IoT endpoint; and
negotiate, with the second IoT endpoint, a chosen protocol for accessing the first resource on the first IoT endpoint in accordance with the first set of communication protocol preferences.

2. The apparatus of claim 1, wherein the instructions further cause the apparatus to report, to the first IoT endpoint, the chosen protocol for communication of the first resource to the second IoT endpoint.

3. The apparatus of claim 1, wherein the instructions further cause the apparatus to send the first set of communication protocols preferences to the second IoT endpoint.

4. The apparatus of claim 1, wherein the first set of communication protocol preferences comprises a list of protocols which are supported by the first IoT endpoint for a given resource and a level of preference one or more protocols in the list of protocols.

5. The apparatus of claim 1, wherein the first set of communication protocol preferences comprises a first set of Constrained Application Protocol CoAP (CoAP) communications preferences for accessing the first resource via CoAP over Transmission Control Protocol (TCP).

6. The apparatus of claim 1, wherein the first set of communication protocol preferences comprises a schedule of times during which certain protocols are supported.

7. The apparatus of claim 1, wherein the first set of communication protocol preferences comprises a schedule of functions for which certain protocols are preferred.

8. The apparatus of claim 1, wherein the first set of communication protocol preferences comprises an indication of a desired CoAP protocol feature.

9. An apparatus implementing an IoT client endpoint, the apparatus comprising a processor, a memory, and communication circuitry, the apparatus being connected to a communications network via its communication circuitry, the apparatus further comprising computer-executable instructions stored in the memory which, when executed by the processor, cause the apparatus resource directory to:
send, to an IoT resource directory, a first resource discovery request comprising criteria for discovering a first needed resource;
receive a first set of communication protocols preferences comprising two or more options for a messaging protocol and/or a transport protocol to be used in communications with an IoT endpoint server for the first needed resource;
negotiate, with from the IoT resource directory, a chosen protocol for accessing the needed resource on the IoT endpoint server in accordance with a first set of communication protocol preferences; and
receive, from the IoT endpoint server using the chosen protocol, the needed resource.

10. The apparatus of claim 9, wherein the instructions further cause the apparatus to receive the first set of communication protocols preferences from the IoT resource directory.

11. The apparatus of claim 9, wherein the first set of communication protocol preferences comprises a list of protocols which are supported by the IoT endpoint server for a given resource and a level of preference one or more protocols in the list of protocols.

12. The apparatus of claim 9, wherein the first set of communication protocol preferences comprises a first set of Constrained Application Protocol CoAP (CoAP) communications preferences for accessing the first resource via CoAP over Transmission Control Protocol (TCP).

13. An apparatus implementing an IoT endpoint server, the apparatus comprising a processor, a memory, and communication circuitry, the apparatus being connected to a communications network via its communication circuitry, the apparatus further comprising computer-executable instructions stored in the memory which, when executed by the processor, cause the apparatus resource directory to:
send, to a first IoT resource directory, a first resource registration request comprising a first set of communication protocol preferences for a first resource hosted on the apparatus, the first set of communication protocols preferences comprising two or more options for a messaging protocol and/or a transport protocol to be used for the first resource;
send, to a second IoT resource directory, a second resource registration request comprising a second set of communication protocol preferences for a second resource hosted on the apparatus, the second set of communication protocols preferences comprising two or more options for a messaging protocol and/or a transport protocol to be used for the second resource, wherein the first and second resource are distinct, and wherein the first and second set of communication protocol preferences are distinct;
receive, from a first IoT endpoint client, a first request to access the first resource in accordance with a first chosen protocol selected from the first set of communication protocol preferences;
receive, from a second IoT endpoint client, a second request to access the second resource in accordance with a second chosen protocol selected from the second set of communication protocol preferences;
provide, to the first IoT endpoint client, access to the first resource in accordance with the first chosen protocol
provide, to the second IoT endpoint client, access to the second resource in accordance with the second chosen protocol.

14. The apparatus of claim 13, wherein the first and second set of communication protocol preferences comprise a list of protocols which are supported by the first IoT endpoint for a given resource and a level of preference one or more protocols in the list of protocols.

15. The apparatus of claim 13, wherein the first set of communication protocol preferences comprises a first set of Constrained Application Protocol CoAP (CoAP) communications preferences for accessing the first resource via CoAP over Transmission Control Protocol (TCP).

16. The apparatus of claim 13, wherein the first set of communication protocol preferences comprises a schedule of times during which certain protocols are supported.

17. The apparatus of claim 13, wherein the instructions further cause the apparatus to send the first message and the second message to an IoT resource directory.

18. The apparatus of claim 17, wherein the first and second set of communication protocol preferences comprise a list of protocols which are supported by the first IoT endpoint for a given resource and a level of preference one or more protocols in the list of protocols.

19. The apparatus of claim 18, wherein the first set of communication protocol preferences comprises a first set of Constrained Application Protocol CoAP (CoAP) communications preferences for accessing the first resource via CoAP over Transmission Control Protocol (TCP).

20. The apparatus of claim 19, wherein the first set of communication protocol preferences comprises a schedule of times during which certain protocols are supported.

\* \* \* \* \*